Figure 1:
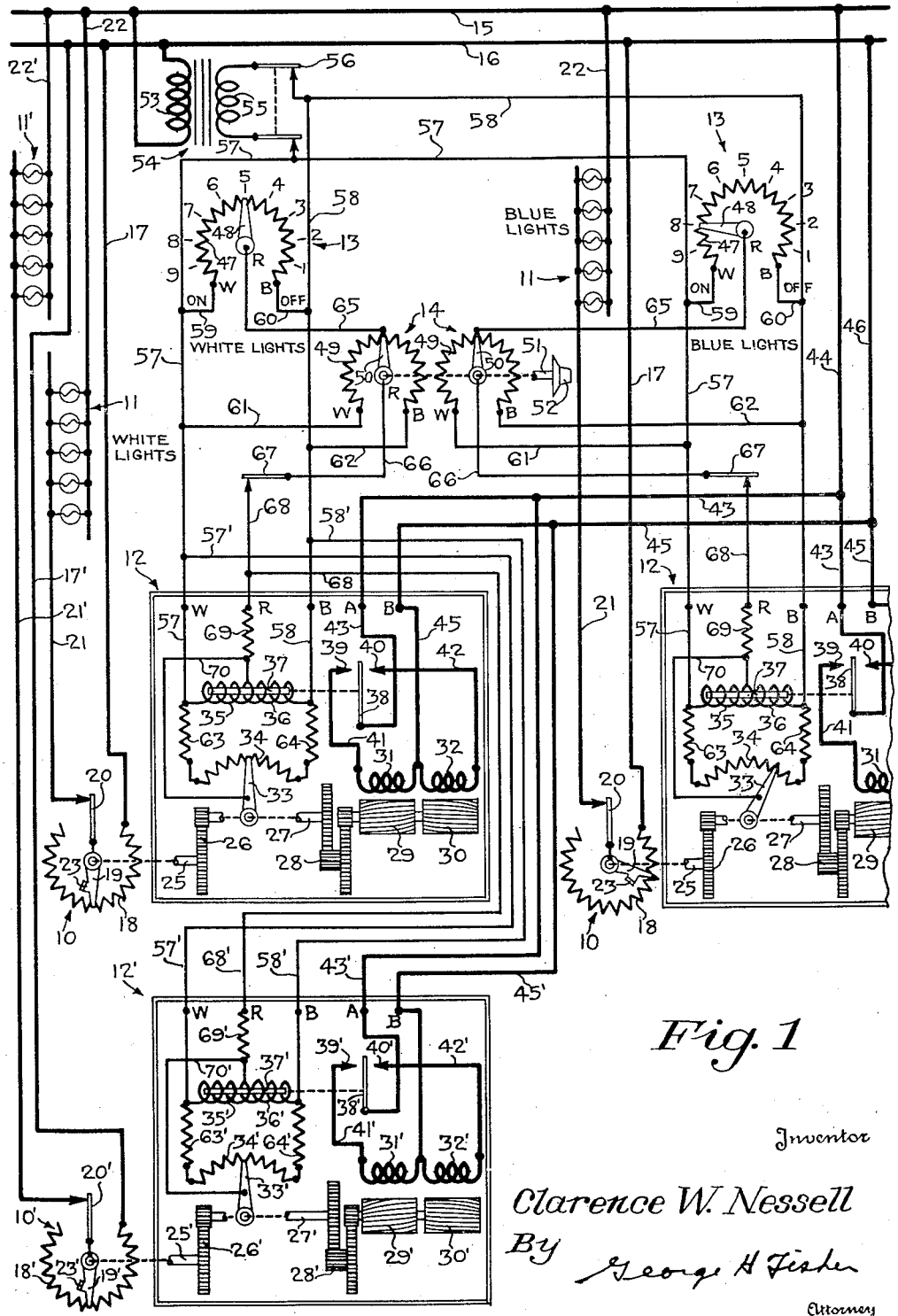

Nov. 21, 1939.  C. W. NESSELL  2,180,764
LIGHTING CONTROL SYSTEM
Filed March 9, 1936   7 Sheets-Sheet 6

Inventor
Clarence W. Nessell
By George H. Fisher
Attorney

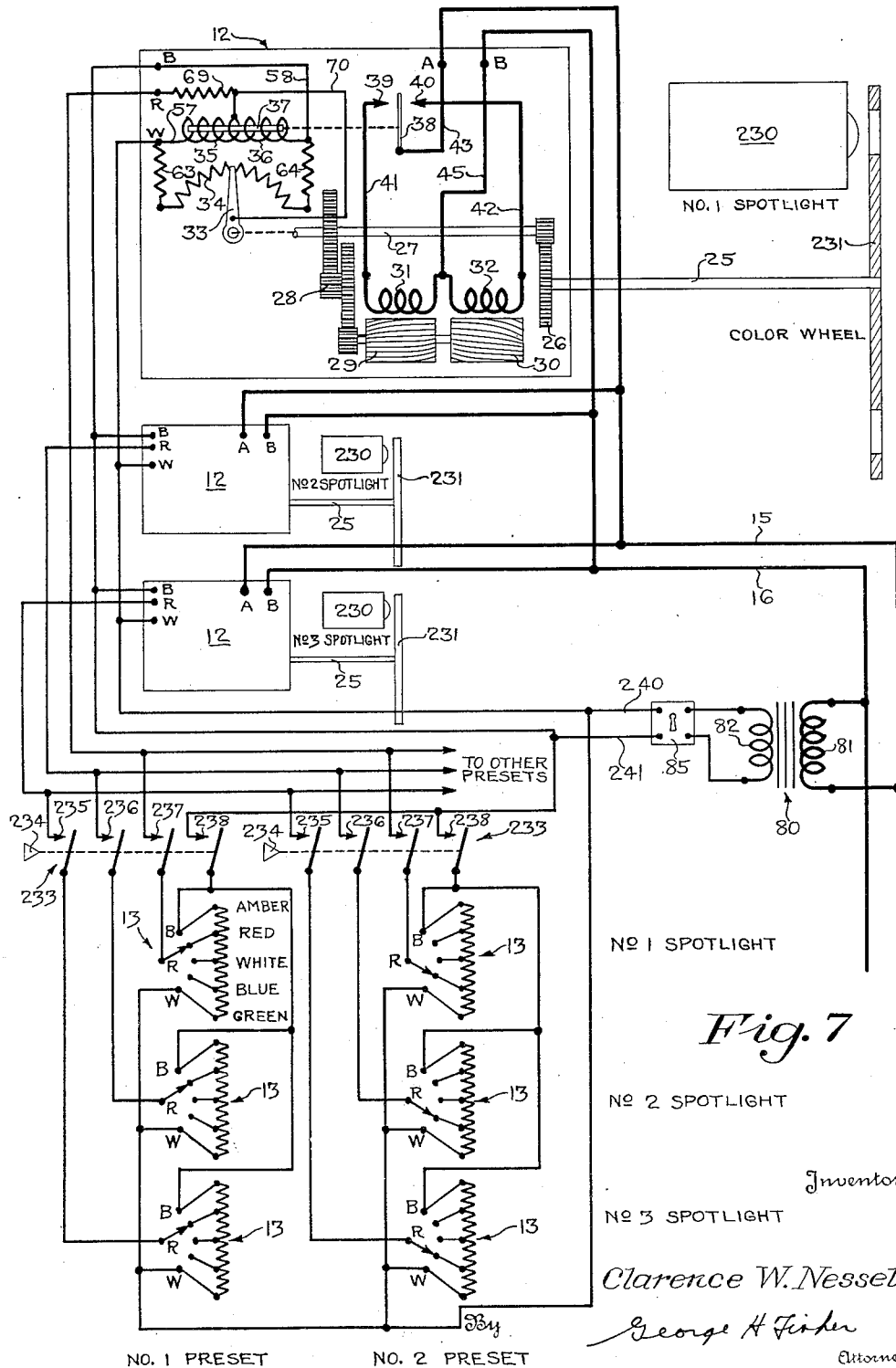

Patented Nov. 21, 1939

2,180,764

UNITED STATES PATENT OFFICE

2,180,764

LIGHTING CONTROL SYSTEM

Clarence W. Nessell, Forest Park, Ill., assignor to Minneapolis-Honeywell Regulator Company, Minneapolis, Minn., a corporation of Delaware Application March 9, 1936, Serial No. 67,819

38 Claims. (Cl. 175—312)

This invention relates to lighting control systems in general and more particularly to lighting control systems for use in theatres, auditoriums and the like.

Present day theatres are equipped with various groups of lights for obtaining different lighting effects on the stage and in the auditorium proper. These groups of lights usually comprise footlights, border lights, flood lights and spotlights for the stage, and dome lights, wall lights and alcove lights for the auditorium. Each group is generally provided with a plurality of variously colored lights. The various lights of the various groups are usually controlled by means of ordinary resistance type dimmer plates or by means of the more recent core type reactors where the lighting load is relatively great.

Attempts have been made in the past to remotely control the various lights of the various groups bu' these attempts have not been entirely successful.

It is therefore the prime object of this invention to control the various lights of the various groups in a new and novel manner whereby innumerable combinations of colors and intensities of lights may be obtained and accurately controlled.

In carrying out my invention I contemplate locating the resistance type dimmer plates or the core type reactors adjacent the lights they control, operating these resistance type dimmer plates or core type reactors by power means which may take the form of proportioning motors operatively connected thereto, and controlling these power means by control devices which may take the form of suitable switches and control impedances located on one or more conveniently located panel boards.

An object of this invention is to provide a control system for controlling the intensities or colors of lights comprising, a proportioning motor operable to a plurality of positions, and a remotely located control device which may take the form of an adjustable potentiometer for positioning the proportioning motor whereby the intensities or colors of lights may be accurately controlled.

Another object of this invention is to provide a control system for controlling the intensities or colors of lights comprising a proportioning motor operable to a plurality of positions, a control potentimeter for positioning the proportioning motor in any desired position, and switching means for rendering the control potentiometer ineffective to control the proportioning motor whereby the proportioning motor is allowed to remain in a given position while the control potentiometer is adjusted or preset to a new position and whereby the proportioning motor is moved to a new position corresponding to the newly adjusted position of the control potentiometer upon subsequent operation of the switching means.

Still another object of this invention is to provide a control system for controlling the intensities or colors of lights comprising a proportioning motor operable to a plurality of positions, a plurality of control potentiometers for the proportioning motor, and switching means for selectively transferring the control of the proportioning motor from one potentiometer to another.

A further object of this invention is to provide a control system for controlling the intensities or colors of lights comprising a plurality of proportioning motors and a single control potentiometer for the motors whereby the motors all assume positions corresponding to the adjustment of the control potentiometer.

Still a further object of this invention is to provide a control system for controlling the intensities or colors of lights comprising a plurality of proportioning motors, a control potentiometer for each motor for positioning the same, another control potentiometer for all of the motors for similarly positioning all of the motors, and means for transferring the control of the motors from their respective control potentiometers to the single control potentiometer.

Another object of this invention is to provide a plurality of motors that are movable to given positions to control the intensities and color combinations of lights with means for proportionately operating the motors to proportionately dim or brighten the lights whereby the lights may be extinguished or brightened to full intensity simultaneously regardless of the intensities of the lights before this operation takes place.

A further object of this invention is to provide a plurality of proportioning motors, an adjustable control potentiometer for each motor for positioning each motor in accordance with the adjustment of its control potentiometer, and other potentiometers for the motors to operate the motors to an extreme position in such a manner that each motor arrives at the extreme position at substantially the same time regardless of the position it was in prior to that time.

Still another object of this invention is to provide a plurality of control devices for lighting control system arranged in presets along with means for automatically rendering the preset in control inoperative when another preset is placed in operation.

A further object of this invention is to provide a control system for lights wherein the intensities of the lights and color combinations thereof may be selected and controlled at will and wherein the lights may all be extinguished by the manipulation of a blackout switch included in the control system.

A still further object of this invention is to provied a plurality of control stations for a lighting control system wherein the light intensities and color combinations of the lights may be manipulated from any convenient location.

Another object of this invention is to provide a plurality of control stations for lighting control systems along with interlocking means for preventing the control of the lighting system by more than one station at any one time.

Another object of this invention is to provide individual or group control of light intensities or color combinations irrespective of any presets which finds particular utility during rehearsals or when immediate light changes are desired.

Still another object of this invention is to provide a proportioning motor for positioning a color wheel of a spotlight in any one of a number of positions, the proportioning motor being controlled by remotely located control devices.

Other objects of this invention reside in the combination of the various novel features of this invention into complete and novel control systems never before contemplated.

Figure 2:
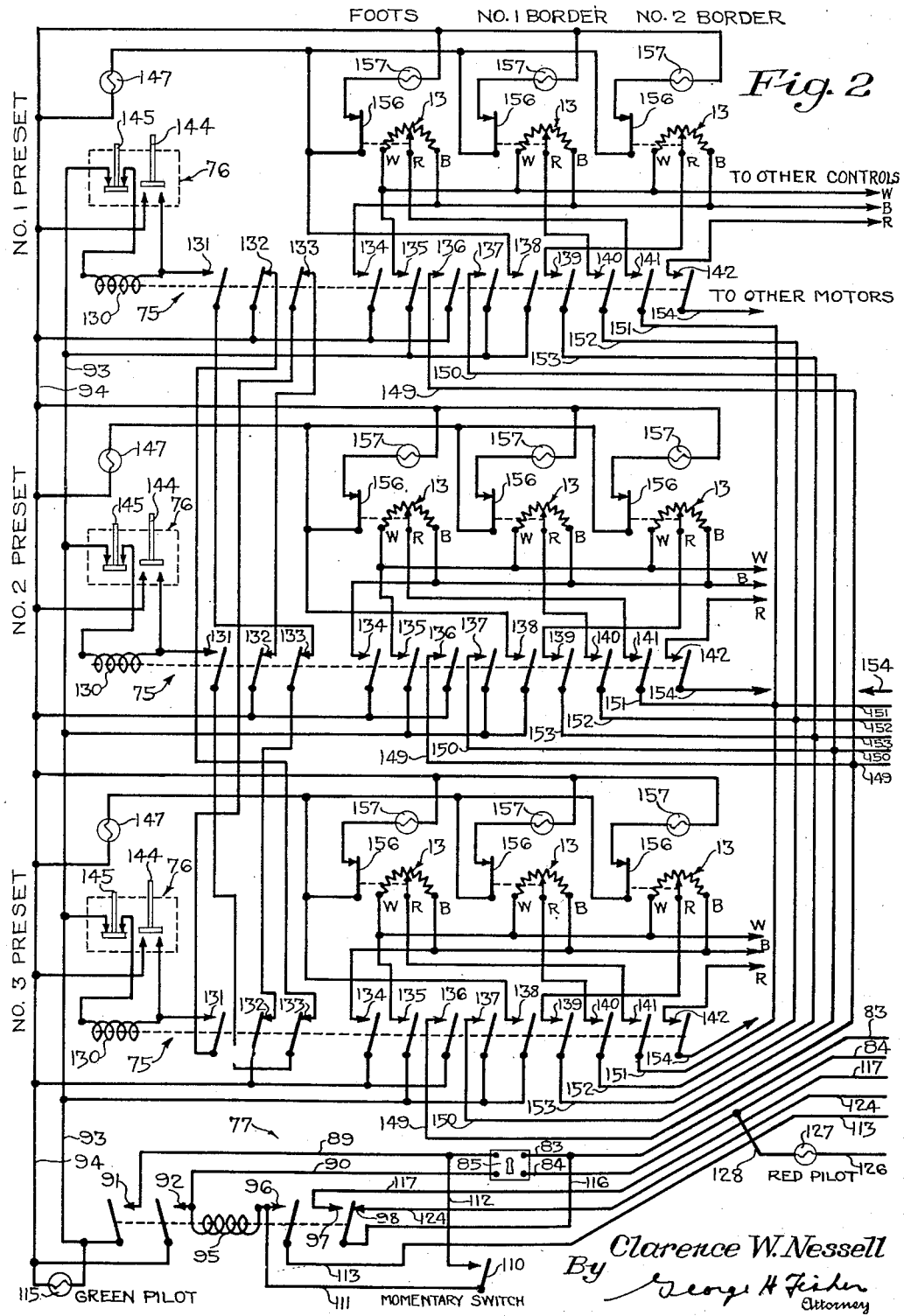
Figure 3:
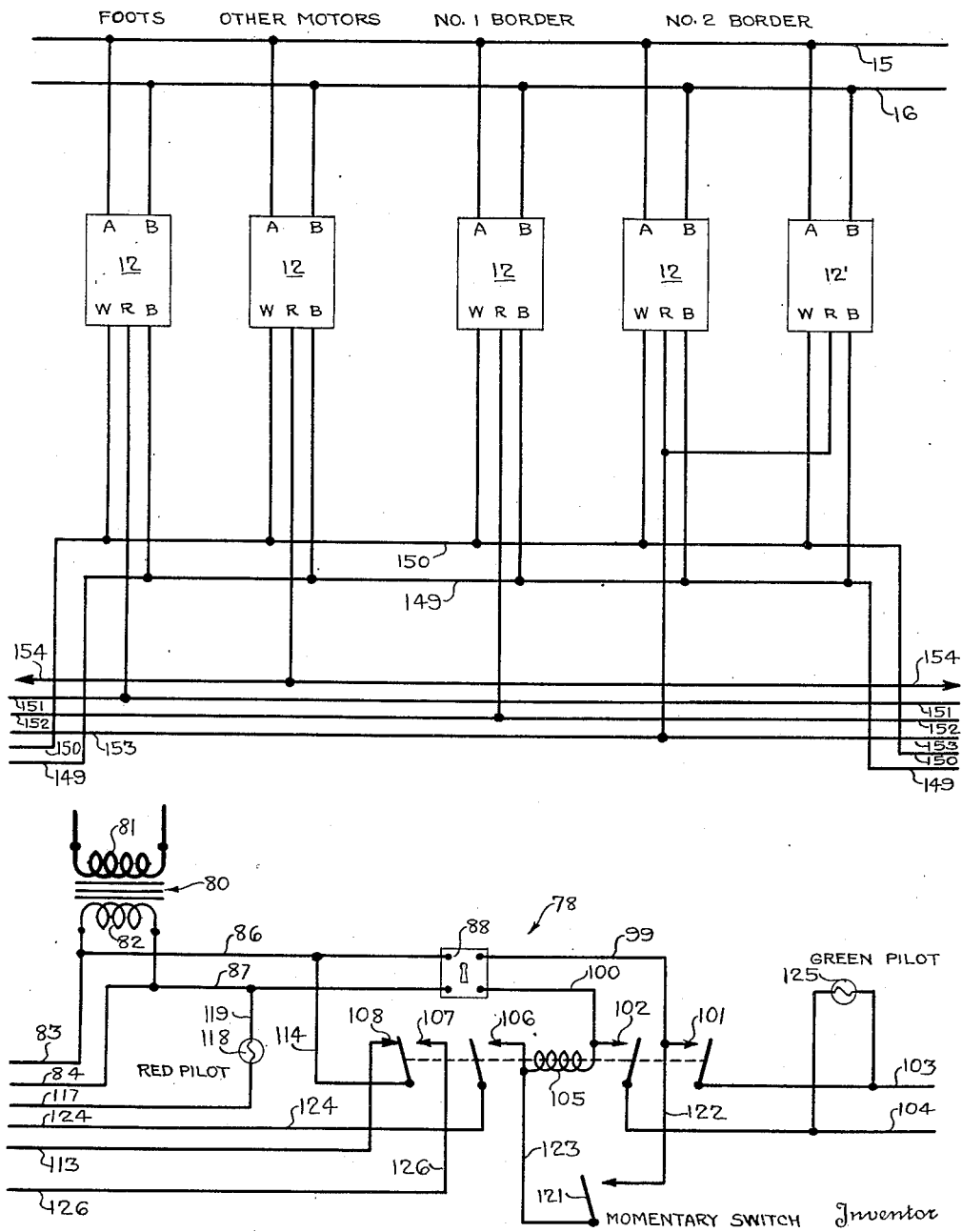
Figure 4:
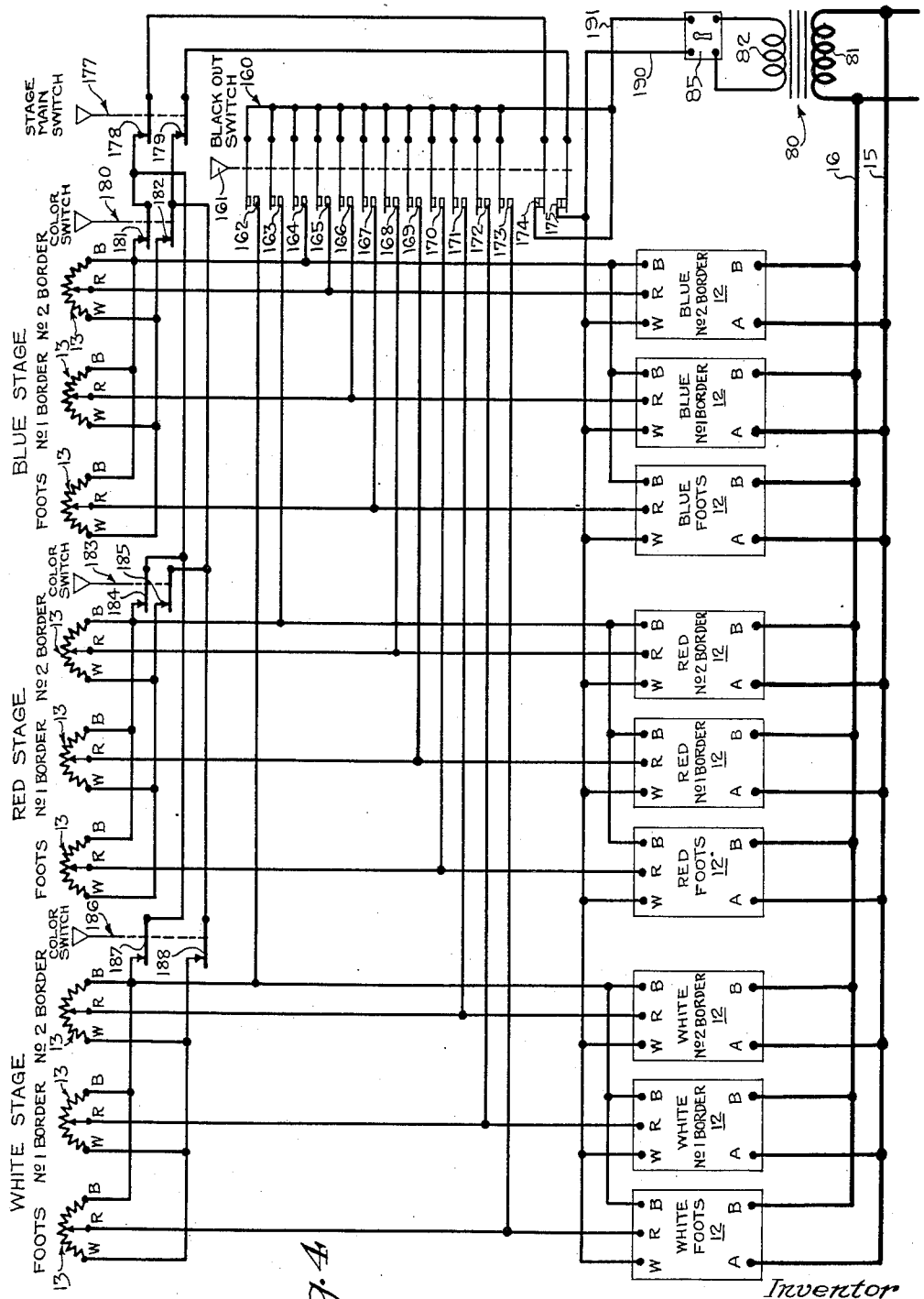
Figure 5:
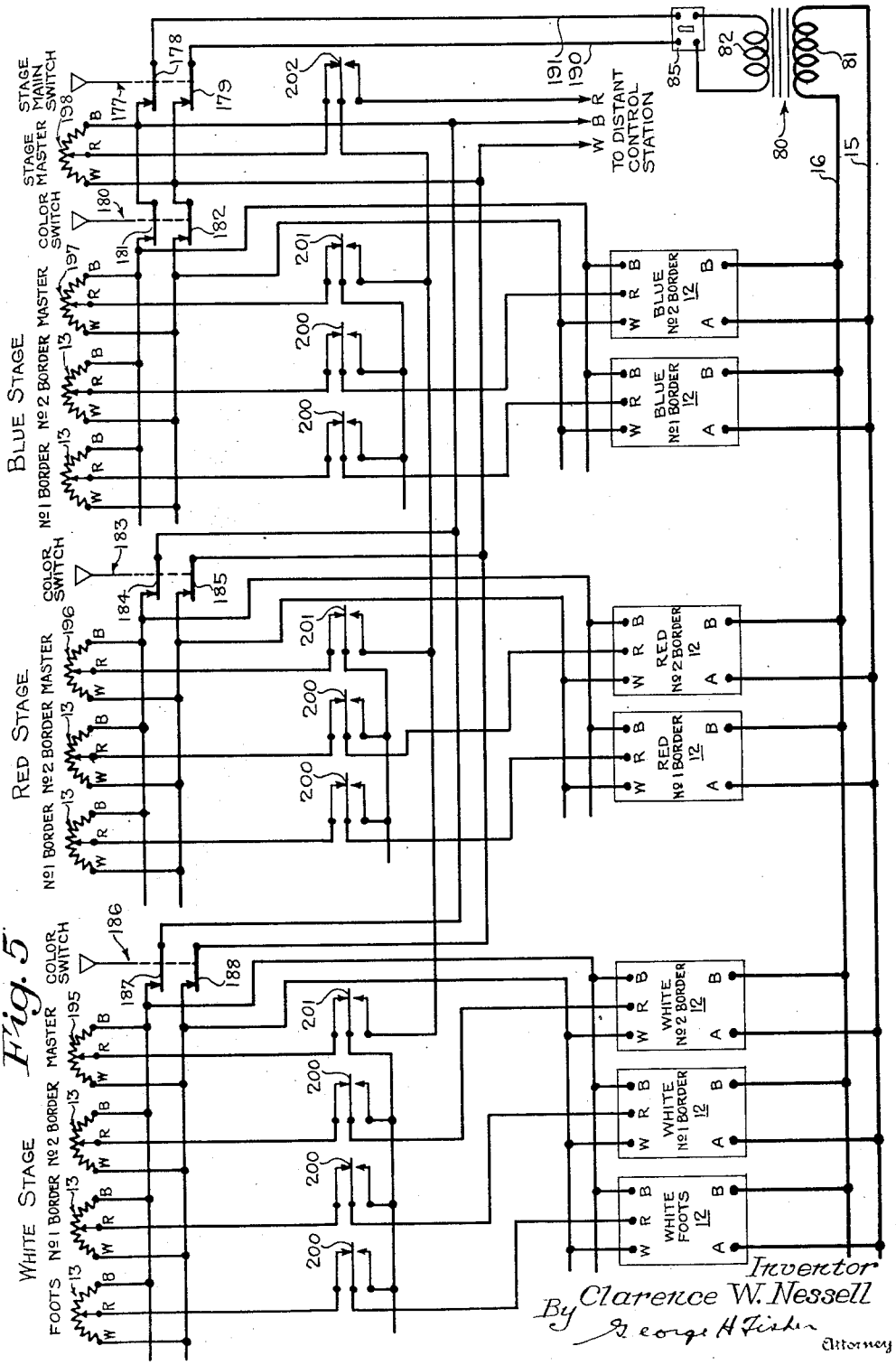
Figure 6:
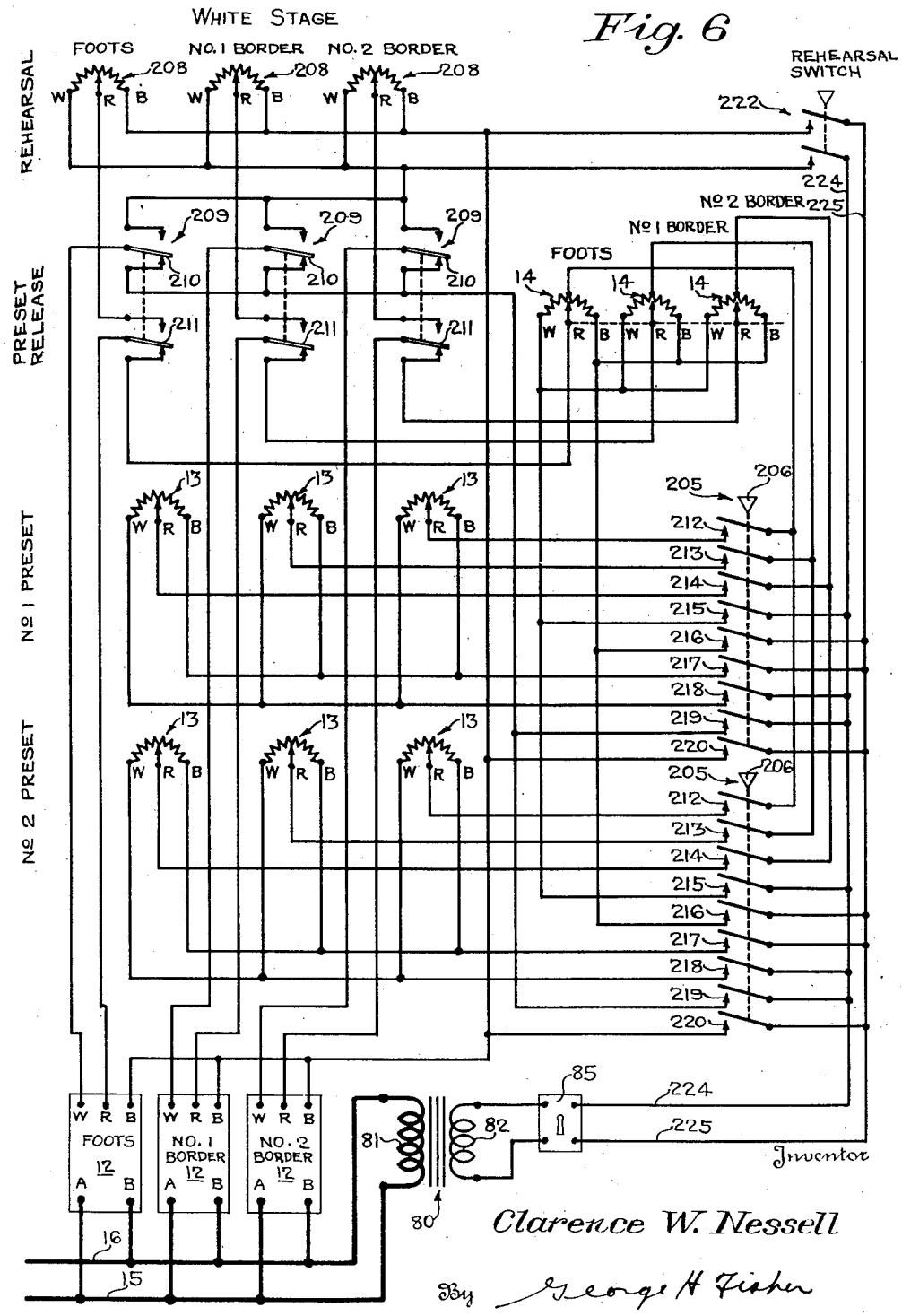

Further objects and advantages of this invention will become apparent to those skilled in the art upon reference to the accompanying specification, claims and drawings, in which drawings:

Figure 1 diagrammatically illustrates the basic principles of operation of the control system of this invention, various combinations of which are disclosed in the remaining figures;

Figures 2 and 3 when placed side by side diagrammatically illustrate one form of this invention wherein a plurality of interlocked presets and a plurality of interlocked control stations are provided;

Figure 4 diagrammatically illustrates another form of this invention wherein the control devices are arranged in groups, wherein the control devices of each group or all of the groups may be preset, and wherein all of the lights may be simultaneously extinguished as by means of a blackout switch;

Figure 5 diagrammatically illustrates another form of this invention wherein the control devices are arranged in groups, wherein the control devices of each group or all of the groups may be preset, wherein the lights of each group may be controlled by a master control device and wherein all of the lights may be controlled by a stage master control device or a remotely located control device;

Figure 6 diagrammatically illustrates another form of my invention wherein the control devices are arranged in presets, wherein other control devices are arranged for trying light combinations irrespective of any preset and wherein the lights may be proportionately dimmed or brightened; and Figure 7 diagrammatically illustrates my invention as applied to the control of a color wheel of a spotlight.

Figure 1

Referring now to Figure 1, I have disclosed the basic portion of my control system, combinations of which are shown in the remaining figures. For purposes of illustration I have shown diagrammatically resistance type dimmer plates generally designated at 10 for controlling a lamp load in the form of lights generally designated at 11. The lamp loads 11 at the left of Figure 1 are designated "white lights", and those at the right of Figure 1 are designated "blue lights". It is within the contemplation of this invention also to vary the lamp loads 11 by any other means known in the art such as core type reactors equipped with choke coils having D. C. fields, the choking effect of which may be governed by potentiometer type resistance dimmer plates instead of the resistance dimmer plates 10 disclosed or by reactors in which the core is rotated. These latter types of control of the lighting loads are usually used for lighting loads of over 10,000 watts, but for purposes of illustration the simplest type is shown in Figure 1. The resistance type dimmer plates or the potentiometer type resistance plates for use within core type reactors or the cores themselves may be operated by proportioning motors generally designated at 12. The proportioning motors 12 may in turn be positioned in any number of a plurality of positions by means of control potentiometers generally designated at 13. Fader potentiometers are designated at 14 for also controlling the proportioning motors 12 whereby the proportioning motors 12 may be proportionately moved to "off" or "on" positions in a specific manner to be pointed out more fully hereafter. The control potentiometer 13 at the left of Figure 1 controls the "white lights" 11 and the control potentiometer 13 at the right of Figure 1 controls the "blue lights" 11 and these control potentiometers are so designated. The control of the "white lights" and the "blue lights" by the control potentiometers 13 and the proportioning motors 12 are identical, and therefore like reference characters have been utilized throughout.

The dimmer plates 10 and the proportioning motors 12 are preferably located adjacent the lamp loads 11 and the proportioning motors 12 are mechanically connected to the dimmer plates 10. The control potentiometers 13 for controlling the proportioning motors 12 may be located on a panel board located in some convenient place remote from the proportioning motors 12 and the dimmer plates 10. The fader potentiometers 14 may be located if desired on the same panel board with the control potentiometers 13.

Line wires leading from some source of power, not shown, are designated at 15 and 16. The line wire 16 may be connected by a wire 17 to one end of the resistance 18 of the dimmer plate 10. A slider 19 cooperating with the resistance 18 is connected by a switch 20 and a wire 21 to the lights 11 forming the lamp load. The lights 11 are in turn connected by a wire 22 to the other line wire 15. The lights 11 are located in parallel and the resistance 18 is located in series with the lights. It is therefore seen that as the slider 19 is moved in a counter-clockwise direction the light intensities of the lamps 11 are increased and when the slider 19 is moved in a clockwise direction the light intensities of the lamps 11 are decreased. The slider 19 may be provided with an abutment 23 which is adapted to engage the switch 20 when all of the resistance 18 is placed in circuit with the lamps 11. This abutment 23 is adapted to open the switch 20 to interrupt the supply of current to the lights 11. The light intensities of the lamps 11 are thus adjusted and when they are dimmed to a predetermined intensity they may be extinguished.

The sliders 19 may be rotated by the proportioning motors 12 through the medium of a shaft 25 which may be driven through suitable gearing 26 by a motor shaft 27. The motor shaft 27 is in turn rotated through reduction gearing 28 by motor rotors 29 and 30 upon energization of field windings 31 and 32. The shaft 27 also rotates a slider 33 with respect to a balancing potentiometer coil 34. The arrangement is such that when the field winding 31 is energized the slider 19 associated with the resistance 18 is rotated in a clockwise direction to dim the lights 11 and the slider 33 is rotated to the left with respect to the balancing potentiometer coil 34. When the field winding 32 is energized the slider 19 is moved in a counter-clockwise direction with respect to the resistance 18 to brighten the lamps 11, and the slider 33 is moved to the right with respect to the balancing potentiometer coil 34.

Proportioning motor 12 also includes a relay comprising coils 35 and 36 for operating a core 37 which is suitably connected to a switch arm 38. The switch arm 38 is adapted to cooperate with spaced contacts 39 and 40. When the relay coil 35 is energized more than the relay coil 36, switch arm 38 is moved into engagement with the contact 39 and when the relay coil 36 is energized more than the relay coil 35 the switch arm 38 is moved into engagement with the contact 40. When the relay coils 35 and 36 are equally energized or when they are deenergized the switch arm 38 is maintained in a position midway between the contacts 39 and 40 as shown in the drawing. For a further detailed understanding of the proportioning motor 12 reference is made to application Serial No. 673,236 filed by Lewis L. Cunningham on May 27, 1933, now Patent No. 2,160,400 of May 30, 1939.

The contact 39 is connected by wire 41 to one end of the field winding 31 and likewise the contact 40 is connected by a wire 42 to one end of the field winding 32. The switch arm 38 is connected by wires 43 and 44 to the line wire 15, and the junction of the field windings 31 and 32 is connected by wires 45 and 46 to the other line wire 16. When the switch arm 38 is moved into engagement with the contact 39, a circuit is completed from the line wire 15 through wires 44 and 43, switch arm 38, contact 39, wire 41, field winding 31 and wires 45 and 46 back to the other line wire 16. Completion of this circuit causes energization of the field winding 31 to dim the lights 11 in the manner pointed out above. Movement of the switch arm 38 into engagement with the contact 40 completes a circuit from the line wire 15 through wires 44 and 43, switch arm 38, contact 40, wire 42, field winding 32 and wires 45 and 46 back to the other line wire 16. Completion of this circuit causes energization of the field winding 32 to cause brightening of the lights 11. When the switch arm 38 is in the midposition shown in the drawing, neither field winding 31 or 32 is energized and the slider 19 is maintained in a given position to maintain the light intensities of the lamps 11 at the adjusted value. Suitable limit switches, not shown, may be provided in the wires 41 and 42 to prevent overtravel of the proportioning motor 12 and consequent overtravel of the slider 19 with respect to the resistance 18.

The control potentiometer generally designated at 13 may comprise a potentiometer coil 47 and a manually operated slider 48 cooperating therewith. Suitable indications may be associated with the slider 48 to indicate the light intensities which the lamps 11 will assume when the slider coincides with certain of the indications. The fader potentiometers 14 may comprise potentiometer coils 49 and sliders 50 cooperating therewith. Preferably the sliders 50 are mounted on a common shaft 51 whereby the sliders 50 of both fader potentiometers 14 are simultaneously rotated. The shaft 51 is shown to be operated by a knob 52, although the shaft 51 may be operated in any suitable manner such as by a timing motor or by a remotely controlled motor similar to proportioning motor 12.

The primary 53 of a step-down transformer 54 having a secondary 55 is connected across the line wires 15 and 16. The secondary 55 is connected to a double pole single throw switch 56. One of the poles of switch 56 is connected by a wire 57 to one end of the relay coil 35. The other pole of the switch 56 is connected by a wire 58 to one end of the relay coil 36. The life-hand end of the potentiometer coil 47 of the control potentiometer 13 is connected by wire 59 to the wire 57, and likewise the right-hand end of the potentiometer coil 47 is connected by wire 60 to the wire 58. The left-hand end of the potentiometer coil 49 of the fader potentiometer 14 is connected by wire 61 to the wire 57 and likewise the right-hand end of the potentiometer coil 49 is connected by wire 62 to the wire 58. The left-hand end of the balancing potentiometer coil 34 is connected by a protective resistance 63 to the left-hand end of the relay coil 35 and likewise the right-hand end of the balancing potentiometer coil 34 is connected by a protective resistance 64 to the right-hand end of the relay coil 36. In this manner it is seen that the potentiometer coils 47 of the control potentiometer 13, 49 of the fader potentiometer 14, and 34 of the balancing potentiometer and the relay coils 35 and 36, are all connected in parallel and across the secondary 55 of the step-down transformer 54 when the double pole single throw switch 56 is closed. The slider 48 of the control potentiometer 13 is connected by a wire 65 to the center of the potentiometer coil 49 of the fader potentiometer 14. The slider 50 of the fader potentiometer 14 is connected by a wire 66, a switch 67, a wire 68 and a resistance 69 to the junction of the relay coils 35 and 36. The junction of the relay coils 35 and 36 is also connected by a wire 70 to the slider 33 associated with the balancing potentiometer coil 34. When the switch 67, which may be manually operated, is closed and when the slider 50 of the fader potentiometer 14 is in the midposition, the slider 48 of the control potentiometer 13, the slider 33 of the balancing potentiometer, and the junction of the relay coils 35 and 36 are connected together.

Referring now to the upper left-hand portion of Figure 1, which relates to the control of the "white lights", it is assumed that the parts are in the position shown. Relay coils 35 and 36 are equally energized by reason of the above referred to parallel relationship and by reason of the sliders 33 and 50 being in the midposition with respect to their potentiometer coils. Movement of the slider 48 to the left towards the "on" position causes partial short-circuiting of the relay coil 35 to decrease the energization thereof and increase the energization of the relay coil 36. This unbalanced relationship of the relay coils 35 and 36 is afforded by the parallel relationship pointed out above. This unbalanced relationship causes movement of the switch arm 38 into engagement with the contact 40 to increase the light intensities of the lights 11 in the manner pointed out above and to rotate the slider 33 towards the right with respect to the balancing potentiometer coil 34. Movement of the slider 33 towards the right causes partial short-circuiting of the relay coil 36 to decrease the energization thereof and increase the energization of the relay coil 35, it being remembered that the relay coil 36 was energized more than the relay coil 35 by reason of the left hand movement of the slider 48 of the control potentiometer 13. When the slider 33 has moved sufficiently far to the right to rebalance the energizations of the relay coils 35 and 36 the switch arm 38 is moved out of engagement with the contact 40 to the mid-position shown to prevent further counter-clockwise movement of the slider 19 and consequent brightening of the lamps 11.

Movement of the slider 48 of the control potentiometer 13 to the right towards the "off" position causes partial short-circuiting of the relay coil 36 to decrease the energization thereof and increase the energization of the relay coil 35. This causes movement of the switch arm 38 into engagement with the contact 39 to rotate the slider 19 in a clockwise direction to dim the lights 21 and also to rotate the slider 33 to the left with respect to the balancing potentiometer coil 34. Movement of the slider 33 to the left with respect to the balancing potentiometer coil 34 causes partial short-circuiting of the relay coil 35 to decrease the energization thereof and increase the energization of the relay coil 36, it being remembered that the relay coil 35 was energized more than the relay coil 36 by reason of the right-hand movement of the control slider 48. When the slider 33 has moved sufficiently far to the left so as to rebalance the energizations of the relay coils 35 and 36 the switch arm 38 is moved out of engagement with the contact 39 to the midposition shown. This stops the further clockwise rotation of the slider 19 and further dimming of the lights 11 is thereby prevented.

In this manner the slider 19 of the dimmer plate 10 may be made to follow the slider 48 of the control potentiometer 13 whereby the light intensities of the lamps 11 may be adjusted to any position desired by manually manipulating the slider 48 of the control potentiometer 13. When the slider 48 of the control potentiometer 13 is moved to the complete "off" position the relay coil 36 is substantially completely short-circuited and the slider 19 of the dimmer plate 10 is moved to a complete clockwise position to open the switch 20 to extinguish the lights 11. Likewise, movement of the slider 48 of the control potentiometer 13 to the full "on" position, the relay coil 35 is substantially completely short-circuited to move the slider 19 of the dimmer plate 10 to the extreme counter-clockwise position whereby the lights 11 are brightened to their fullest extent.

After the slider 48 of the control potentiometer 13 has been moved to a desired position to adjust the light intensities of the lamps 11 and the light intensities of these lamps have been so adjusted in the manner pointed out above, the double pole single throw switch 56 may be opened to break the supply of electrical power to the relay coils 35 and 36 of the proportioning motor 12. The proportioning motor 12 and consequently the dimmer plate 10 will remain in this adjusted position, since the switch arm 38 is maintained in a mid-position with respect to the contacts 39 and 40 when the coils 35 and 36 are deenergized. The slider 48 of the control potentiometer 13 may be then moved to another position but this will not cause operation of the slider 19 of the dimmer plate 10, since the control circuit is rendered inoperative by reason of the switch 56 being open. In this manner the control potentiometer 13 may be preset while the proportioning motor 12 is maintained in a desired position. When the switch 56 is subsequently closed to again supply electrical power to the control system, the slider 19 of the dimmer plate 10 is rotated to a position to correspond with that of the control slider 48 to readjust the light intensities of the lights 11. Therefore, the light intensities of the lamps 11 may be adjusted to one value and maintained at that value while the control slider 48 of the control potentiometer 13 is being moved to another position. Subsequently, when the switch 56 is closed the light intensities of the lights 11 are then adjusted to the new position according to the new position of the control slider 48. If the switch 56 is maintained closed the light intensities of the lamps 21 may be modulated or faded by slowly rotating the control slider 48.

Opening of the manual switch 67 breaks the connection between the slider 48 of the control potentiometer 13 and the junction of the relay coils 35 and 36. This prevents the control potentiometer 13 from unbalancing the relay coils 35 and 36 whereby the control potentiometer 13 is rendered ineffective to control the proportioning motor 12.

The above described mode of operation, wherein the proportioning motor 12 and consequently the dimmer plate 10 are positioned in accordance with the positioning of the control potentiometer 13, was predicated on the fact that the sliders 50 of the fader potentiometers 14 were located in the midposition shown in the drawing. This midposition of the sliders 50 connects the slider 48 of the control potentiometer 13 directly to the junction of the relay coils 35 and 36, whereby the fader potentiometer coils 14 have no effect upon the relay coils 35 and 36. As pointed out above, the fader potentiometers 14 are connected in parallel with the relay coils 35 and 36. By reason of this parallel relationship movement of the slider 50 towards the right from the midposition shown decreases the energization of the relay coil 36 and increases the energization of the relay coil 35 in exactly the same manner as does right-hand movement of the slider 48 of the control potentiometer 13. This right-hand movement of the slider 50 therefore operates the proportioning motor 12 to move the slider 19 of the dimmer plate in a clockwise direction. When the slider 50 is moved to the complete right-hand position the relay coil 36 is substantially completely short-circuited whereby the lights 11 are extinguished. In this connection it is pointed out that as the slider 50 of the fader potentiometer 14 is moved towards the right from the midposition shown, resistance is added in series with the slider 48 of the control potentiometer 13, this resistance being progressively placed in series with the slider 48 of the control potentiometer 13 and therefore progressively rendering the control potentiometer 13 less effective to control the energizations of the relay coils 35 and 36. Therefore, whatever position the slider 48 of the control potentiometer 13 may assume, movement of the slider 50 of the fader potentiometer 14 from the midposition shown in the drawing to the extreme right-hand position causes extinguishment of the lights 11.

Conversely, movement of the slider 50 of the fader potentiometer 14 to the left from the midposition shown in the drawing to the complete left-hand position progressively operates the proportioning motor 12 to move the slider 19 of the dimmer plate 10 to a complete counter-clockwise position whereby the intensities of the lights 11 are increased to 100% brilliancy. Left-hand movement of the slider 50 of the fader potentiometer 14 also adds resistance in series with the slider 48 of the control potentiometer 13 to render the control potentiometer 13 progressively less effective to control the proportioning motor 12. Therefore, as the sliders 50 of the fader potentiometers 14 are moved from the midposition to either extreme position the control of the proportioning motors 12 is gradually taken away from the control potentiometer 13 and the proportioning motors 12 are operated to either extinguish the lights 11 or to increase the light intensities thereof to 100%, dependent upon which way the sliders 50 are moved.

As pointed out above, the sliders 50 of the fader potentiometers 14 are connected together for simultaneous movement, whereupon the proportioning motors 12 associated with the respective fader potentiometers 14 are moved to either extreme position depending upon the direction of movement of the sliders 50. As shown in Figure 1, the control potentiometer 13 for the "white lights" is in a midposition and therefore the "white lights" are at 50% brilliancy. The control potentiometer 13 for the "blue lights" is in a three-quarters "on" position whereby the light intensities of the "blue lights" are substantially 75%. If the sliders 50 of the fader potentiometers 14 are moved at a rate slower than the maximum rate of movement of the proportioning motors 12, the proportioning motors 12 will be moved towards either extreme position and both proportioning motors 12 will arrive at that extreme position at exactly the same time. Specifically, movement of the sliders 50 towards the right causes movement of the proportioning motors 12 towards the "off" position whereby the lights 11 are extinguished and the "white lights" and the "blue lights" are extinguished at exactly the same time. Similarly, movement of the sliders 50 towards the left causes operation of the proportioning motors 12 to increase the intensities of the lights to 100%, and the "white lights" and the "blue lights" will be adjusted to this 100% brilliancy at exactly the same time. Therefore, it follows that no matter what position the proportioning motors 12 may be in these proportioning motors may be moved to either extreme position under the control of the fader potentiometers 14 and will arrive at these extreme positions at exactly the same time. By reason of this construction true proportionate dimming or brightening of the lights are obtained, whereby accurate blending of the various colors of lights is obtained.

Assume now that the sliders 50 of the fader potentiometers 14 are in the extreme right hand position. The proportioning motors 12 are therefore maintained in such position as to maintain the lights 11 extinguished. The sliders 48 of the control potentiometers 13 may therefore be adjusted to any desired position but the motors 12 will remain in the "off" position. Movement of the sliders 50 from the extreme right-hand position to the midposition shown in the drawing gradually places the control of the proportioning motors 12 under the control of their respective control potentiometers 13, and when the sliders 50 are finally moved to the midposition shown in the drawing the proportioning motors 12 will assume positions corresponding to the positions of their respective control potentiometers 13, and if the sliders 50 of the fader potentiometers 14 are moved at a rate slower than the maximum speed of the proportioning motors 12, the proportioning motors 12 will arrive at their desired positions at exactly the same time. In this manner the lights may be brightened in a proportionate manner from an "off" condition to a desired condition and the rate of travel of the proportioning motors 12 is so controlled that the proportioning motors 12 will arrive at their desired positions at exactly the same time. By use of the above construction true proportionate dimming and true proportionate brightening of the various lights are obtained.

Generally speaking, the maximum electrical capacity of a single dimmer plate is about 3600 watts. It may be desired to control a lamp load greater than 3600 watts from a single control potentiometer 13. This may be accomplished in two ways: One, by using the core type reactor for controlling the lamp load as pointed out above, or, two, by using a plurality of resistance type dimmer plates, and this latter method is disclosed in Figure 1. The lighting load, designated as "white lights", may be split up into two loads 11 and 11', the load 11 being controlled by the resistance type dimmer plate 10 in the manner pointed out above, and the load 11' being controlled by the resistance type dimmer plate 10'. The dimmer plate 10' may be controlled by another proportioning motor 12', the construction of which is identical with that of 12. The motor 12' may be supplied with power from the line wires 15 and 16 by wires 43', 43 and 44 and 45', 45 and 46. The relay coils 35' and 36' may be connected to the control potentiometer 13 by wires 57', 58' and 68' in the same manner that the relay coils 35 and 36 of the proportioning motor 12 are connected thereto. The resistances 69 and 69' in the proportioning motors 12 and 12' are provided so that the two proportioning motors 12 and 12' will operate identically in response to movement of the control slider 48 of the control potentiometer 13, or in response to the slider 50 of the fader potentiometer 14. The specific manner in which this mode of operation is accomplished is set forth in an application Serial No. 33,070 filed by myself and Lewis L. Cunningham on July 25, 1935. By reason of this construction a single control potentiometer identically positions two or more resistance type dimmer plates. Like elements of the proportioning motor 12' have been designated by like reference characters primed so that the operation of the proportioning motor 12' may be easily followed upon reference to the operation of the proportioning motor 12.

The left-hand ends of the potentiometer coil 47 of the control potentiometer 13, the potentiometer coil 49 of the fader potentiometer 14, and the relay coil 35 have been designated as W, and the right-hand ends of the control potentiometer coil 47, the fader potentiometer coil 49 and the relay coil 36 have been designated as B, and the slider 48 of the control potentiometer 13, the slider 50 of the fader potentiometer 14 and the junction of the relay coils 35 and 36 have been designated as R. The designations W, B and R represent respectively white, blue and red, and upon reference to the accompanying Figures 2 to 7 it will be noted that the white connections of the various potentiometers are connected to the white connections of the proportioning motors, the blue of the various potentiometers are connected to the blue of the proportioning motors, and likewise the red of the various potentiometers are connected to the red of the proportioning motors, in exactly the same manner as they are connected in Figure 1. These designations of white, blue and red are made to facilitate the description of my invention as disclosed in Figures 2 to 7. When the sliders of the various potentiometers are moved towards the white connection the light intensities of the lamps are increased and when the sliders are moved towards the blue the light intensities are decreased, and when the sliders are in the extreme blue position the lights are extinguished. The power connections to the various proportioning motors 12 are designated by the characters A and B.

Now that the general mode of operation of the basic principles of my invention are understood, reference is now made to the remaining figures of the drawing, wherein there are disclosed various combinations of my control system illustrated in Figure 1, to arrive at new and novel results never before obtained in the art of lighting control systems.

Figures 2 and 3

Referring now to Figures 2 and 3, I have shown one form of my invention which utilizes the above described principles of operation to afford control of lights from remotely located control panels. In Figure 2 is illustrated one control panel which may be located in any convenient place such as the stage of a theatre, having a plurality of control potentiometers 13 for controlling a plurality of proportioning motors 12 shown in Figure 3. The proportioning motors 12 operate current controlling devices and may be located near their respective lamp loads. By placing Figures 2 and 3 side by side a composite wiring diagram of the complete system may be obtained. As shown in Figure 2 for purposes of illustration only, there are three sets of control potentiometers 13 and they are designated as "No. 1 preset", "No. 2 preset" and "No. 3 preset." Each preset is shown to have a plurality of control potentiometers 13 and these control potentiometers are designated as "foots", "No. 1 border", and "No. 2 border." The control potentiometers 13 of the three presets designated "foots" are adapted to control the proportioning motor 12 in Figure 3 designated "foots." The control potentiometers 13 of the three presets designated "No. 1 border" are adapted to control the proportioning motor 12 of Figure 3 designated "No. 1 border." The control potentiometers 13 of the three presets designated "No. 2 border" are adapted to control both of the proportioning motors 12 and 12' of Figure 3 designated "No. 2 border." Any one preset may be placed in operation by means of an "off-and-on" switch generally designated at 76, each preset being provided with one of these switches.

Each switch 76 is adapted to operate a relay generally designated at 75 for placing the various presets in and out of operation.

The control panel illustrated in Figure 2 may be placed in operation by a master control generally designated at 77 and illustrated at the bottom of Figure 2. The various proportioning motors 12 shown in Figure 3 may be controlled also by another control panel located at some other point, such as the projection booth of a theatre, and this second control panel may in all respects be the same as the control panel illustrated in Figure 2. This second control panel may be placed in operation by means of a master control 78 shown in the lower right-hand portion of Figure 3. The master controls 77 and 78 of the two control panels are so arranged and interlocked that only one control panel may be in operation at a time.

Power is supplied to the connections A and B of the various proportioning motors 12 by means of the line wires 15 and 16 leading from some source of power, not shown. Power may be supplied to the control panels and consequently the control systems by means of a step-down transformer 80 having a primary 81 and a secondary 82. The secondary 82 may be connected by wires 83 and 84 to a lock switch 85 on the first control panel. The secondary 82 of the step-down transformer 80 may also be connected by wires 86 and 87 to a lock switch 88 located on the second control panel. The lock switch 85 is connected by wires 89 and 90 and switches 91 and 92 to busses 93 and 94 which deliver power to the control devices on the first panel. When the switches 91 and 92 are closed the busses 93 and 94 are supplied with power so that the various control potentiometers 13 on the first panel may control the various proportioning motors 12. The switches 91 and 92 are controlled by a relay coil 95 and this relay coil 95 in turn controls other switches 96, 97 and 98. When the relay coil 95 is energized the switches 91, 92, 96 and 97 are closed and when the relay coil 95 is deenergized these switches are opened and the switch 98 is closed as shown in Figure 2.

In a like manner, the lock switch 88 of the second control panel is connected by wires 99 and 100 and switches 101 and 102 to busses 103 and 104 which supply power to the control potentiometers of the second panel. The switches 101 and 102 are controlled by a relay coil 105 which also controls switches 106, 107 and 108. The arrangement is such that when the relay coil 105 is energized the switches 101, 102, 106 and 107 are closed and when the relay coil 105 is deenergized these switches are opened and the switch 108 is closed as shown in the lower portion of Figure 3.

The master controls 77 and 78 of the two control panels are each provided with momentary switches 110 and 121 respectively. Assume that the lock switch 85 of the first control panel is closed and that the momentary switch 110 is moved to a closed position. A circuit is then completed from the secondary 82 through wire 84, lock switch 85, wire 90, relay coil 95, wire 111, momentary switch 110, wires 112 and 89, lock switch 85 and wire 83 back to the secondary 82. Completion of this circuit causes energization of the relay coil 95 to close the switches 91 and 92 to supply power to the busses 93 and 94. Energization of the relay coil 95 also closes the switch 96 to complete a maintaining circuit from the secondary 82 through wire 84, lock switch 85, wire 90, relay coil 95, switch 96, wire 113, switch 7

108 of the master control 78 of the second control panel, and wires 114 and 86 back to the secondary 82. Completion of this circuit maintains the relay coil 95 energized even though the momentary switch 110 is subsequently opened. In this manner the supply of power to the busses 93 and 94 is maintained. A green pilot light 115 connected across the busses 93 and 94 indicates that the first control panel is energized and ready for operation. Closing of the switch 97 by the energization of the relay coil 95 completes a circuit from the secondary 82 through wires 83 and 116, switch 97, wire 117, a red pilot light 118 on the second control panel, and wires 119 and 87 back to the secondary 82. This causes lighting of the red pilot light on the second control panel to warn the operator thereof that the control potentiometers 13 of the first control panel are in control of the various proportioning motors 12.

If the operator of the second control panel should decide to take over the control of the various proportioning motors 12, he opens the lock switch 88 and closes the momentary switch 121. This completes a circuit from the secondary 82 through wire 86, lock switch 88, wires 99 and 122, momentary switch 121, wire 123, relay coil 105, wire 100, lock switch 88 and wire 87 back to the secondary 82. Completion of this circuit causes energization of the relay coil 105 to close the switches 102, 101, 106 and 107 and to open the switch 108. Closure of the switches 102 and 101 supplies power to the busses 103 and 104 of the second control panel. Opening of the switch 108 breaks the maintaining circuit for the relay coil 95 of the first control panel whereby the switches 91, 92, 96 and 97 are opened and the switch 98 closed. This stops the supply of power to the busses 93 and 94 of the first control panel. Closure of the switch 106 upon energization of the relay coil 105 completes a circuit from the secondary 82 through wire 87, lock switch 88, wire 100, relay coil 105, switch 106, wire 124, switch 98 which was closed by the deenergization of relay coil 95, and wires 116 and 83 back to the secondary 82. This completes a maintaining circuit for the relay coil 105 to maintain the supply of power to the busses 103 and 104 of the second control panel. A green pilot light 125 connected across the busses 103 and 104 indicates that the second control panel is in condition for operation. Closure of the switch 107 completes a circuit from the secondary 82 through wires 86 and 114, switch 107, wire 126, red pilot light 127 on the first control panel, and wires 128 and 84 back to the secondary 82. Completion of this circuit causes lighting of the red pilot light on the first control panel to indicate that the second control panel is in control of the various proportioning motors 12.

From the above it is seen that I have provided an interlocking switching mechanism for supplying power to one control panel or another control panel along with means for indicating at each control panel which control panel is in operation. It is impossible to supply power to both control panels at the same time. The lock switches 85 and 88 are provided to prevent haphazard operation of these control panels so that only those persons who have keys for the lock switches may control the operation of the various proportioning motors. Although I have disclosed master controls for only two control panels it is obvious that the number of master controls and the number of control panels may be increased as desired.

The relays 75 which place the control potentiometers 13 of the various presets in control of the proportioning motors 12 may comprise a relay coil 130 for operating switches 131 to 142 inclusive. The arrangement is such that when the relay coil 130 is energized the switches 131 and 134 to 142, inclusive, are closed and when the relay coil 130 is deenergized these switches are opened and the switches 132 and 133 are closed. The relays 75 for the various presets are identical and like reference characters have been used to designate like elements. The "on-and-off" switches 76 which control each of the relays 75 may comprise an "on" button 144 and an "off" button 145.

Assume the parts in the position shown in Figure 2. Movement of the "on" button 144 of the first preset to a circuit closing position completes a circuit from the bus 94 through the "on" button 144, relay coil 130 and "off" button 145 to the other bus 93. Completion of this circuit causes energization of the relay coil 130 to perform the above mentioned switching functions. Closure of the switch 131 by energization of the relay coil 130 completes a maintaining circuit for the relay coil 130 of the first preset from the bus 94 through switch 132 of the third preset, through switch 133 of the second preset, through switch 131 of the first preset, relay coil 130 and "off" button 145 of the first preset back to the other bus 93. Completion of this circuit maintains the relay coil 130 of the first preset energized as long as the switch 133 of the second preset and the switch 132 of the third preset are closed. The relay coil 130 of the first preset may be deenergized by opening the "off" button 145 of the first preset or by opening the switches 133 and 132 of the second and third presets respectively.

In a like manner closure of the "on" button of the second preset energizes the relay coil 130 of the second preset, and closure of the switch 131 upon energization of the relay coil 130 of the second preset completes a maintaining circuit from the bus 94 through switch 132 of the first preset, switch 133 of the third preset, switch 131 of the second preset, relay coil 130 of the second preset, and "off" button 145 of the second preset to the bus 93. Similarly, the relay coil 130 of the third preset is energized by closure of the "on" button 144 associated therewith, and the relay coil 130 is maintained energized through a circuit from the bus 94 through switch 132 of the second preset, switch 133 of the first preset, switch 131 of the third preset, relay coil 130 of the third preset, and "off" button 145 of the third preset back to the other bus 93. It is noted at this point that the switches 132 and 133 of each preset are included in the maintaining circuits of the relay coils 130 of the various presets. It therefore follows that each relay coil 130 of each preset may be energized by closure of the "on" button associated with that relay and may be deenergized by opening of the "off" button associated with that relay. It also follows that if the relay coil 130 of one preset is energized closure of the "on" button of any other preset deenergizes that first relay coil and energizes the second relay coil, whereby when one preset is placed in control the other presets are automatically rendered inoperative.

Located on the control panel adjacent each preset is a pilot light 147 which is lighted through a circuit from the bus 93 through switch 138 of its associated relay 75 and the pilot light 147 back to the other bus 94. Therefore, when any preset is in operation the pilot light 147 associated therewith is lighted to indicate this fact.

Closure of the switch 134 of the first preset connects the blues of the control potentiometers 13 of that preset to the bus 94, and likewise, closure of the switch 135 of the first preset connects the whites of all of the control potentiometers 13 of that preset to the bus 93. Closure of the switch 136 of the first preset connects the bus 94 and the blues of the control potentiometers 13 to a conductor 149 which extends to the blues of all of the proportioning motors 12. Likewise, closure of the switch 137 connects the bus 93 and the whites of the control potentiometers 13 of the first preset to a conductor 150 which extends to the whites of all of the proportioning motors 12. In this manner the whites and blues of the control potentiometers 13 and the proportioning motors 12 are connected together in parallel and across the busses 93 and 94 in the manner illustrated in Figure 1.

Closure of the switch 141 connects the red of the control potentiometer 13 designated "foots", to a conductor 151 which extends to the red of the proportioning motor 12 designated "foots." Likewise, closure of the switch 140 connects the red of the control potentiometer 13 designated "No. 1 border" to a conductor 152 which extends to the red of the proportioning motor 12 designated "No. 1 border." Similarly, closure of the switch 139 connects the red of the control potentiometer 13 designated "No. 2 border" to a conductor 153 which extends to the potentiometers 12 and 12' designated "No. 2 border." Other control potentiometers may be connected in parallel with the control potentiometers 13 shown in Figure 2, and the reds of these control potentiometers may be connected through suitable switches operated by the relays 130 to the reds of other proportioning motors. Specifically, the red of one of these other control potentiometers may be connected to a conductor 154 upon closure of the switch 142, the conductor 154 leading to the red of the proportioning motor 12 designated "Other motors." Therefore, it is seen that any number of proportioning motors 12 and any number of control potentiometers 13 may be utilized and still remain within the concept of my invention.

From the above connections it is seen that when the relay coil 130 of "No. 1 preset" is energized the control potentiometers 13 of "No. 1 preset" are connected to the proportioning motors 12 in the manner illustrated in Figure 1, and these proportioning motors 12 will assume positions corresponding to the positions of the various sliders of the control potentiometers 13, the operation of which was specifically referred to with respect to Figure 1. In a like manner energization of the relay coil 130 of "No. 2 preset" places the proportioning motors 12 under the control of the control potentiometers 13 of the "No. 2 preset." Similarly, energization of relay coil 130 of "No. 3 preset" places the control potentiometers 13 thereof in control of the proportioning motors 12.

Summarizing briefly the operation of this portion of the invention, the various control potentiometers 13 of "No. 1 preset" may be positioned as desired, and when the relay coil 130 of "No. 1 preset" is energized, the proportioning motors 12 will assume positions corresponding to the positions of their respective control potentiometers 13 of "No. 1 preset." After the proportioning motors 12 have moved to the desired positions the relay coil 130 may be deenergized by opening the "off" button 145 and the proportioning motors will remain in the position that they assume. Since the connections to the proportioning motors are broken by deenergization of the relay coil 130, the control potentiometers 13 of the "No. 1 preset" may be placed in other desired positions, and when the "on" contact 144 is closed to energize the relay coil 130 of "No. 1 preset", the proportioning motors 12 will then assume the new position as determined by the new positions of the control potentiometers of "No 1 preset."

If it be desired to go directly from one preset to another preset, as for example, from the first preset to the second preset, the "on" button of the second preset may be closed to energize the relay coil 130 of the second preset which automatically renders the first preset inoperative to control the proportioning motors 12 and places the control of the proportioning motors 12 under the second preset, the proportioning motors 12 assuming positions corresponding to the positions of the control potentiometers 13 of the second preset. Similarly, energization of the relay coil 130 of the third preset places the second preset out of control of the proportioning motors 12 and places the proportioning motors 12 under the control of the control potentiometers 13 of the third preset, and the proportioning motors 12 will move to positions to correspond with the settings of the control potentiometers 13 of the third preset.

If it be desired to extinguish the lights, the control potentiometers 13 of one of the presets may be adjusted to the extreme blue or "off" position, and when the proportioning motors 12 are placed under the control of this preset the proportioning motors 12 will be operated to an "off" position, thereby extinguishing the lights operated thereby.

The sliders of the various control potentiometers 13 are adapted to operate a switch 156, the arrangement being such that when the sliders are in the extreme blue or "off" position the switch 156 is opened and when the sliders are moved out of these extreme blue or "off" positions the switch 156 is closed. The switch 156 is adapted to control a pilot light 157 associated with each control potentiometer 13. When the switch 138 operated by the relay coil 130 is closed upon placing the particular preset in operation, a circuit is completed from the bus 93 through switch 138, switch 156 and pilot light 157 back to the bus 94, providing the control potentiometer is not in the extreme blue or "off" position. Therefore, when the control potentiometer 13 is in such position as to cause lighting of the lamps controlled thereby and when the particular preset is placed in control of the various proportioning motors 12, the pilot light 157 is lighted and indicates that the various control potentiometers 13 are in a lighting position.

*Figure 4*

Referring now to Figure 4. I have shown a lighting control system embodying the basic principles of operation in Figure 1. This lighting control system utilizes a plurality of proportioning motors 12 for controlling the lighting load, and each motor is controlled by a remotely located control potentiometer 13. As shown in the drawings, the control system is divided up into three groups designated "white stage", "red stage"

and "blue stage", for controlling the white lights, the red lights and the blue lights respectively. Although I have shown only three groups, as many more groups as may be desired may be utilized. Also, as shown in Figure 4, each group comprises three control potentiometers 13 controlling three proportioning motors 12, one of these potentiometers controlling the "foots", another controlling the "No. 1 border", and another controlling the "No. 2 border" proportioning motors. It is within the contemplation of this invention to include more than three control potentiometers 13 and three proportioning motors 12 within each group.

Power is supplied to the connections A and B of the various proportioning motors 12 by line wires 15 and 16. Power is supplied to the control system through the step-down transformer 80 having a primary 81 and a secondary 82, the primary 81 being connected to some source of power, not shown, and the secondary 82 being connected to a lock switch 85. This portion of the invention contemplates the use of a blackout switch generally designated at 160 for extinguishing all of the lights, the operation of which will be pointed out more fully hereafter. This blackout switch 160 may comprise an operator 161 for controlling switches 162 to 175 inclusive. The arrangement is such that when the operator 161 is in the position shown in the drawings the switches 162 to 173 inclusive are opened and switches 174 and 175 are closed. When the operator 161 is moved downwardly from the position shown in the drawings the switches 162 to 173 inclusive are closed and the switches 174 and 175 are opened. This invention also contemplates the use of a stage main switch 177 comprising switches 178 and 179, a color switch 180 for the "blue stage" group, comprising switches 181 and 182, a color switch 183 for the "red stage" group, comprising switches 184 and 185, and a color switch 186 for the "white stage" group, comprising switches 187 and 188.

The lock switch 85 when closed supplies power to busses 190 and 191. The bus 190 is connected to the whites of all of the proportioning motors 12 and to the switch 175 of the blackout switch 160. The bus 191 is connected to the switch 174 of the blackout switch 160 and is also connected to the movable contacts of switches 162 to 173 inclusive of the blackout switch 160. The switches 174 and 175 of the blackout switch 160 are connected respectively to the switches 178 and 179 of the stage main switch 177. The switches 178 and 179 of the stage main switch 177 are in turn connected to the switches 181 and 182 of the color switch 180, switches 184 and 185 of the color switch 183, and the switches 187 and 188 of the color switch 186. The arrangement is such that the switches of the color switches 180, 183 and 186 are arranged in parallel and the switches of the stage main switch 177 are arranged in series with the color switches. The switch 181 of the color switch 180 is connected to the blues of the control potentiometers 13 of the "blue stage" group and the switch 182 is connected to the whites of the control potentiometers 13 of the "blue stage" group. In a like manner, the switches 184 and 185 are connected respectively to the blues and whites of the control potentiometers 13 of the "red stage" group. Similarly, the switches 187 and 188 are connected to the blues and whites respectively of the control potentiometers 13 of the "white stage" group. The blues of the control potentiometers 13 of each group are connected to the blues of the proportioning motors 12 of that group. The red of each control potentiometer 13 is connected to the red of its associated proportioning motor 12. From the above wiring connections it is seen that the blues of the control potentiometers 13 and the blues of the proportioning motors are directly connected together and that power is supplied to the blues of both the control potentiometer 13 and the proportioning motor 12 through the switch 174 of the blackout switch 160. It is also seen that power is at all times supplied to the whites of the proportioning motors 12 and that the whites of the control potentiometers 13 are connected to the whites of the proportioning motors 12 and to the bus 190 through the switch 175 of the blackout switch 160. Therefore, with the switches in the position shown in the drawings the whites, blues and reds of the control potentiometers are connected to the whites, blues and reds of the associated proportioning motors 12 and to the secondary 82 of the step-down transformer 80 in the manner illustrated in Figure 1.

By reason of these connections the proportioning motors 12 will assume positions corresponding to the positions of their associated control potentiometers 13 in a manner pointed out above with respect to Figure 1. Opening of the color switch 180 stops the supply of power to the control potentiometers 13 of the "blue stage" group and the proportioning motors 12 will remain in the positions corresponding to the positions of the control potentiometers 13. Since the supply of power to the control potentiometers 13 is prevented by the opening of the color switch 180, these control potentiometers may be adjusted to new positions, and when the color switch 180 is thereafter closed the proportioning motors 12 of the "blue stage" group will be moved to new positions in accordance with the new settings of the control potentiometers 13 of that group. In this manner presetting of the control potentiometers of the "blue stage" group may be accomplished. The color switches 183 and 186 of the "red stage" group and "white stage" group respectively perform exactly the same function. When the switches 183 or 186 are opened the control potentiometers 13 of either group may be adjusted to new positions without affecting the present positions of the proportioning motors 12 of those groups. Upon subsequent closure of the color switches 183 or 186 the proportioning motors of the "red stage" group or the "white stage" group will assume new positions in accordance with the positions of the control potentiometers 13 of those groups.

Since the stage main switch 177 stops the supply of power to all of the control potentiometers 13 upon opening thereof, pre-setting of all of the control potentiometers at one time is provided, and when the stage main switch is subsequently moved to a closed position all of the proportioning motors 12 will be moved to the new positions determined by the positions of their associated control potentiometers 13.

By reason of the above construction a lighting control system is provided wherein the motors and control potentiometers are divided into a plurality of groups, and wherein each group contains a plurality of motors and control potentiometers. Each group is provided with a color switch so that the control potentiometers of that group may be pre-set for subsequent movement of the motors to new positions upon reclosure of the color switch of that group. The stage main switch is provided whereby all of the contro!

potentiometers of all groups may be adjusted and all of the motors moved to new positions upon subsequent closure of the stage main switch.

The blackout switch 160 is provided to move all of the proportioning motors 12 to the "off" position whereby all of the lights controlled by these motors 12 are extinguished. All of the blues of the proportioning motors 12 of the "blue stage" group are connected to the switch 164 of the blackout switch 160. Likewise, all of the blues of the proportioning motors 12 of the "red stage" group are connected to the switch 163 and all of the blues of the proportioning motors 12 of the "white stage" group are connected to the switch 162. Reading from right to left, the red of each proportioning motor 12 is connected respectively to switches 165 to 173 inclusive. The movable contacts of switches 162 to 173 inclusive are connected together and to the bus 191. The whites of all of the proportioning motors 12 are connected to the bus 190.

Movement of the operator 161 of the blackout switch 160 downwardly closes switches 162 to 173 inclusive and opens switches 174 and 175. Opening of the switches 174 and 175 stops the supply of power to the control potentiometers 13 of all of the groups to render these control potentiometers inoperative to control the proportioning motors 12 in the same manner as does the stage main switch 177. Closure of the switches 162, 163 and 164 connects the blues of all of the proportioning motors 12 to the bus 191 and since the whites of all of the proportioning motors 12 are connected to the bus 190, power is supplied to the relay coils 35 and 36 (Figure 1) of the proportioning motors 12. Closure of the switches 165 to 173 inclusive connects the red and blue of each proportioning motor 12 whereby the coil 36 (Figure 1) is substantially completely short-circuited. This causes movement of the proportioning motors 12 to a complete "off" position since complete left-hand movement of the slider 33 of the balancing potentiometer (Figure 1) to the left is required to rebalance the coils 35 and 36. In this manner movement of the operator 161 of the blackout switch 160 downwardly causes a simultaneous movement of all of the proportioning motors 12 to an "off" position. Upon movement of the operator 161 upwardly to the position shown in the drawings, the connections between the blue and red of each of the proportioning motors is broken whereby the short-circuit of the relay coil 36 (Figure 1) is likewise broken, and since the switches 174 and 175 of the blackout switch 160 are closed the control of the proportioning motors 12 is returned to their respective control potentiometers 13 and the proportioning motors 12 will be moved to positions corresponding to the positions of their associated control potentiometers 13.

Summarizing briefly the mode of operation of the lighting control system illustrated in Figure 4, it is seen that the proportioning motors 12 of each stage group are controlled by the control potentiometers 13 of that group, that each group may be preset by reason of the color switch for that group, and that all groups may be preset by reason of the stage main switch. Provision is made for moving all of the proportioning motors 12 simultaneously to an "off" position whereby all of the lights will be extinguished, this last mode of operation being accomplished by means of a single blackout switch. When the blackout switch is restored to the normal position, all of the proportioning motors 12 assume positions according to the positions of their respective control potentiometers 13 providing the stage main switch and the color switches of each color group are closed.

Figure 5

In Figure 5 I have shown a lighting control system somewhat similar to that shown in Figure 4 and which also utilizes the principles of operation shown in Figure 1. Like that of Figure 4, the control system of Figure 5 is divided into a plurality of groups designated as "white stage" group, "red stage" group, and "blue stage" group. In each group are a plurality of control potentiometers 13 which are designated "foots", "No. 1 border", and "No. 2 border." However, the control potentiometer 13 designated "foots" has been omitted from the "red stage" group and the "blue stage" group in order to conserve space on the drawing. Each control potentiometer 13 is adapted to control a proportioning motor 12 in the manner pointed out above with reference to Figures 1 and 4. As in Figure 4, each group of control potentiometers 13 is provided with a color switch to allow presetting of the control potentiometers of that group. Likewise, there is shown a stage main switch for allowing presetting of all of the control potentiometers 13 of all of the groups. The various color switches and the stage main switch have been indicated by the same reference characters that they are indicated by in Figure 4. As in Figure 4, the number of groups and the number of control potentiometers 13 in each group may be increased as desired. The blackout switch 160 of Figure 4 is not shown in Figure 5.

Master control potentiometers 195, 196 and 197 are provided for the "white stage", the "red stage" and the "blue stage" groups respectively. The purpose of these master control potentiometers is to provide a means whereby all of the lights of one group may be controlled by a single master control potentiometer. A stage master control potentiometer is designated at 198 and the purpose of this potentiometer is to provide a means whereby all of the lights of all of the stage groups may be controlled by a single potentiometer.

Power is supplied to the connections A and B of the proportioning motors 12 by means of the line wires 15 and 16, and power is supplied to the control system by means of the step-down transformer 80, the primary 81 of which is connected across the wires 15 and 16. The secondary 82 of the step-down transformer 80 is connected to the lock switch 85 which in turn is connected to busses 190 and 191. The busses 190 and 191 are connected to the switches 178 and 179 of stage main switch 177, and the switches 178 and 179 are in turn connected respectively to the switches 181 and 182 of the color switch 180 of the "blue stage" group, the switches 184 and 185 of the color switch 183 of the "red stage" group, and the switches 187 and 188 of the color switch 186 of the "white stage" group. The color switches 180, 183 and 186 are connected in parallel with respect to each other and in series with the stage main switch 177. The blues and whites of the control potentiometers 13 and of the motors 12 of the "white stage" group are connected to the switches 187 and 188 respectively of the color switch 186. In a like manner the blues and whites of the control potentiometers 13 and of the proportioning motors 12 of the "red stage" group are connected respectively to the switches 184 and 185 of the color switch 183. Similarly, the blues and whites of the control potentiometers 13 and the proportioning motors 12 of the "blue stage" group are connected respectively to the switches 181 and 182 of the color switch 180. The master control potentiometers 195, 196 and 197 are connected in parallel with the blues and whites of the control potentiometers 13 of their respective groups. The blue and white of the stage master control potentiometer are connected to the switches 178 and 179 respectively of the stage main switch 177. From the above wiring connections it is seen that when all of the color switches 180, 183 and 186 and the stage main switch 177 are closed the blues and whites of all of the motors are connected across the busses 190 and 191. In order to switch the control of the proportioning motors 12 of a group from the control potentiometers 13 of that group to the master control potentiometer of that group I have provided control switches 200. In order to extend the control of the proportioning motors 12 of any group from the control of the master control potentiometer of that group to the stage master control potentiometer 198 I have provided the control switches 201. In order to transfer the control of all of the proportioning motors 12 from the stage master control potentiometer 198 to a remotely located control station I have provided a control switch 202.

With the control switches 200, 201 and 202 in the positions shown in the drawings it is seen that the reds of the control potentiometers 13 are connected to the reds of their associated proportioning motors 12. In this manner the control potentiometers 13 are connected to the proportioning motors 12 in the manner indicated in Figure 1, and the proportioning motors 12 will assume positions corresponding to the positions of their associated control potentiometers 13. The color switches 180, 183 and 186 stop the supply of power to the control potentiometers 13 whereby presetting of these control potentiometers in the manner pointed out in connection with Figure 4 is accomplished, and movement of the stage main switch 177 to an open position stops the supply of power to all of the control potentiometers 13 whereby all of the control potentiometers may be preset, also in the manner pointed out with respect to Figure 4.

Movement of the switches 200 downwardly breaks the connection between the red of the proportioning motors 12 and the red of their associated control potentiometers 13 whereby the control potentiometers 13 are rendered inoperative to control the proportioning motors 12. This downward movement of the control switches 200 connects all of the reds of the proportioning motors 12 of a given group to the red of the master control potentiometer of that group. Specifically, the reds of the proportioning motors of the "blue stage" group are connected to the red of the master control potentiometer 197 of the "blue stage" group. Similarly, the reds of the master potentiometers 195 and 196 of the "white stage" group and the "red stage" group are connected to the reds of the proportioning motors 12 of their respective groups. In this manner the proportioning motors 12 of each group are placed under the control of the master control potentiometer of that group and the proportioning motors 12 will assume positions corresponding to the positions of the master control potentiometers. Opening of the color switch of any group breaks the supply of power to the master control potentiometer of that group whereby the master control potentiometer of that group may be preset in the manner pointed out in connection with Figure 4.

If it be desired to place all of the proportioning motors 12 of all of the groups under the control of the stage master control potentiometer 198 the switches 200 and 201 are moved downwardly, whereby the connection between the reds of the proportioning motors and the reds of the control potentiometers 13 and the master control potentiometers 195, 196 and 197 are broken. This downward movement of the control switches 200 and 201 connects the reds of all of the proportioning motors 12 to the red of the stage master control potentiometer 198 whereby the stage master control potentiometer 198 is connected to the proportioning motors 12 in the manner illustrated in Figure 1, and the proportioning motors 12 will assume positions corresponding to the position of the stage master controller 198. Opening of the stage main switch 177 permits presetting of the stage master control potentiometer without movement of the proportioning motors 12 until such time as the stage main switch 177 is again closed, whereupon the proportioning motors 12 will move to new positions corresponding to the positions of the stage master control potentiometer 198.

If it be desired to control all of the proportioning motors 12 from a remotely located control station, the control switches 200, 201 and 202 are moved downwardly to break the connections between the reds of the proportioning motors 12 and the reds of the control potentiometers 13, the reds of the master control potentiometers 195, 196 and 197 and the red of the stage master control potentiometer 198. Downward movement of the control switch 202 connects the reds of all of the proportioning motors 12 to the red of a remotely located control potentiometer, not shown, the whites and blues of this remotely located control potentiometer being connected to the whites and blues of the proportioning motors 12 and across the busses 190 and 191. In this manner all of the proportioning motors 12 are positioned in accordance with the position of the remotely located control potentiometer of the distant control station. Summarizing briefly the operation of the lighting control system illustrated in Figure 5, the control system is divided into a plurality of groups and each group comprises a plurality of control potentiometers and associated proportioning motors to be positioned thereby. Each group is also provided with a master control potentiometer and suitable control switches whereby all of the lights of that group may be controlled by the master control potentiometer. Each group is also provided with a color switch whereby the control potentiometers of that group or the master control potentiometer of that group may be preset while the proportioning motors remain in a given position. A stage master control potentiometer and suitable control switches are provided whereby the control of all of the proportioning motors may be placed under the control of the stage master control potentiometer. A stage main switch is provided to allow presetting of the control potentiometers of all of the groups, the master control potentiometer of all of the groups or the stage master control potentiometer, but still maintaining the proportioning motors in their given position while adjustment is being made. Provision is also made for controlling all of the proportioning motors from a distant control station.

Figure 6

Referring now to Figure 6, I have shown another form of my invention wherein proportioning motors 12 may control the white lights of the stage and these proportioning motors are designated "foots" "No. 1 border" and "No. 2 border". Power is supplied to the connections A and B of the proportioning motors 12 by means of line wires 15 and 16 leading from some source of power, not shown. The proportioning motors are adapted to be controlled by control potentiometers 13 in the manner illustrated in Figure 1. The control potentiometers 13 are arranged in presets designated "No. 1 preset" and "No. 2 preset". Each preset has a control potentiometer 13 for controlling one of the proportioning motors 12 and these control potentiometers are arranged and designated as "foots" "No. 1 border" and "No. 2 border". Although I have shown only two presets and only three control potentiometers in each preset, it is within the contemplation of this invention to increase the number of presets and to increase the number of control potentiometers 13 in each preset and the number of proportioning motors 12 as desired.

The control potentiometers 13 of the various presets are placed in control of the proportioning motors by means of preset switches generally designated at 205 which, for purposes of illustration, are shown to be manually operated by means of a knob 206. These switches 205, however, may be electrically operated in the manner illustrated in Figure 2. This form of the invention also utilizes fader potentiometers 14 for proportionately dimming or brightening the lights in the manner illustrated in connection with Figure 1. These fader potentiometers 14 are designated as "foots" "No. 1 border" and "No. 2 border" for controlling their respective proportioning motors 12.

In order to adjust the proportioning motors 12 to vary the light intensities without breaking any preset, I have provided rehearsal potentiometers generally designated at 208, whereby each or all of the proportioning motors 12 may be adjusted as desired. This portion of the invention finds particular utility in stage lighting systems for rehearsal purposes or where a quick change in the lighting effect is desired without breaking any preset. The rehearsal potentiometers 208 are placed in control of the proportioning motors 12 by means of double pole double throw preset release switches 209 comprising switch arms 210 and 211. Power is supplied to the rehearsal potentiometers 208 by means of a rehearsal switch generally designated at 222.

The preset switches 205 comprise switches 212 to 220 inclusive, the arrangement being such that when the manual operator 206 is moved downwardly these switches are made and when the manually operated knob 206 is moved upwardly the switches are broken.

Power is supplied to the control system by a step-down transformer 80 having a secondary 82 and a primary 81 which is connected across the line wires 15 and 16. The secondary 82 is connected to a lock switch 85, and when the lock switch 85 is closed power is supplied to busses 224 and 225 which extend to the rehearsal switch 222.

The bus 224 is connected to the movable switch arms of the switches 215, 218 and 219 of the preset switches 205, the stationary contacts thereof being connected respectively to the whites of the fader potentiometers 14, the whites of the control potentiometers 13, and to the lower contacts associated with the switch arms 210 of the preset release switches 209. The bus 225 is connected to the movable switch arms of the switches 216, 217 and 220 of the preset switches 205, the stationary contacts thereof being respectively connected to the blues of the fader potentiometers 14, the blues of the control potentiometers 13, and to the blues of the proportioning motors 12. The switch arms 210 of the preset release switches 209 are connected to the whites of the proportioning motors 12. The reds of the proportioning motors 12 are connected to the switch arms 211 of the preset release switches 209, and the lower contacts associated with these switch arms 211 are connected to the reds of the fader potentiometers 14. The center taps of the fader potentiometers 14 are connected through the switches 212, 213 and 214 of the preset switches 205 to the reds of the control potentiometers 13.

From these connections it is seen that when the preset release switches 209 are in the position shown in the drawings, when the sliders of the fader potentiometers 14 are in the midposition shown in the drawings, and when the preset switch 205 of "No. 1 preset" is closed, the whites of the proportioning motors 12 are connected to the whites of the control potentiometers 13 of the "No. 1 preset", to the whites of the fader potentiometers 14, and to the bus 224. The blues of the proportioning motors 12 are connected to the blues of the control potentiometers 13 of "No. 1 preset", the blues of the fader potentiometers 14, and to the bus 225. The reds of the proportioning motors are connected to the reds of their respective control potentiometers 13 of "No. 1 preset" through the switch arms 211, the center taps and sliders of the fader potentiometers 14. Therefore, the proportioning motors 12 are connected to the control potentiometers 13 of "No. 1 preset" in exactly the same manner as they are connected in Figure 1, and therefore the proportioning motors 12 are caused to assume positions corresponding to the positions of the control potentiometers 13 of "No. 1 preset."

Opening of the preset switch 205 of "No. 1 preset" breaks the connections between the control potentiometers 13 of that preset and the proportioning motors 12, whereby the proportioning motors 12 may remain in their present positions while the control potentiometers 13 of "No. 1 preset" are being adjusted to new positions. Upon subsequent closures of the preset switch 205 of "No. 1 preset" the proportioning motors 12 will be caused to assume new positions corresponding to the new positions of the control potentiometers 13 of "No. 1 preset." If it be desired to have the proportioning motors 12 assume positions corresponding to the positions of the control potentiometers 13 of "No. 2 preset" the preset switch 205 of "No. 1 preset" is opened to render that preset inoperative to control the proportioning motors 12, and the preset switch 205 of "No. 2 preset" is closed whereby the proportioning motors 12 move to positions corresponding to the positions of the control potentiometers 13 of "No. 2 preset." The control potentiometers 13 of "No. 2 preset" may be preset in exactly the same manner as those of "No. 1 preset."

Assume that the preset switch 205 of the "No. 1 preset" is closed whereby the proportioning motors 12 are positioned in accordance with the positions of the control potentiometers 13 of "No. 1 preset." Since the fader potentiometers 14 are connected in the circuit between the control potentiometers 13 and the proportioning motors 12 in exactly the same manner as disclosed in Figure 1, movement of the sliders of the fader potentiometers 14 towards the blue causes dimming of the lights in a proportionate manner whereby all of the lights are extinguished at exactly the same time, regardless of their intensities before this operation. Likewise, movement of the sliders of the fader potentiometers 14 from the extreme blue position to the midposition shown in the drawings, brightens the lights from an "off" condition to those conditions which are determined by the positions of the control potentiometers 13 of "No. 1 preset." Movement of the sliders of the fader potentiometers 14 from the midposition to the extreme white position causes proportionate brightening of the lights controlled by the proportioning motors 12 and the lights will be brightened to 100% intensity at exactly the same time. Movement of the sliders of the fader potentiometers 14 from the extreme white position to the midposition dims the lights from 100% brilliancy to that brilliancy which is determined by the position of the control potentiometer 13 of "No. 1 preset." The specific manner in which this proportionate dimming and brightening of the lights is accomplished is described in detail in connection with Figure 1. When the preset switch 205 of "No. 2 preset" is closed, the control potentiometers 13 of that preset are placed in control of the proportioning motors 12 and the fader potentiometers 14 operate in connection with these control potentiometers to cause proportionate dimming and brightening of the lights in the manner pointed out in connection with "No. 1 preset".

From the above it is seen that I have provided a lighting control system wherein the control devices of a plurality of lights are arranged in presets, wherein presetting of the lights is accomplished, and wherein the lights may be proportionately brightened or dimmed regardless of which preset is in control of the proportioning motors 12.

It often occurs, as during rehearsal periods, that it is desirable to change the intensities of some of the lights while leaving the other lights at their adjusted values. Specifically, it may be desired to brighten the "foots" but maintain the various border lights at the same intensities to see what effect this would have. It is often desired to do this without breaking the preset which is already in control whereby the two lighting effects may be compared. This mode of operation is accomplished by the rehearsal potentiometers 208 and the preset release switches 209. Closure of the rehearsal switch 222 connects the whites and blues of the rehearsal potentiometers 208 to the busses 224 and 225 respectively. The blues of the proportioning motors are connected to the blues of the rehearsal potentiometers 208. Movement of the preset release switches 209 upwardly connects the whites of the rehearsal potentiometers 208 to the whites of the proportioning motors, and also breaks the connection between the reds of the proportioning motors and their associated control potentiometers 13. This movement of the preset release switches 209 also connects the reds of the rehearsal potentiometers 208 to the reds of the proportioning motors 12. Each rehearsal potentiometer 208 is provided with a preset release switch 209 whereby the control of any proportioning motor 12 may be taken from its associated control potentiometer 13 and placed under the control of the rehearsal potentiometer 208.

Assume that the preset release switches 209 are all located in the down position and that the switch 205 of "No. 1 preset" is closed, then the proportioning motors 12 are positioned in accordance with the positions of the control potentiometers 13 of that preset. Assume now that the preset release switch 209 associated with the proportioning motor 12 designated "foots" is moved upwardly, the control of this proportioning motor is taken away from its control potentiometer 13 and placed under the control of the rehearsal potentiometer 208. By suitably manipulating the associated rehearsal potentiometer 208 the correct lighting intensity controlled by the proportioning motor 12 designated "foots" may be obtained. When this correct lighting intensity is obtained the control potentiometer 13 of "No. 1 preset" designated "foots" may be adjusted to a position corresponding to the position of the rehearsal potentiometer 208 designated "foots". The preset release switch 209 is then moved downwardly to the position shown in the drawing and the proportioning motor 12 designated "foots" is caused to remain in this position corresponding to the newly adjusted position of the control potentiometer 13 of "No. 1 preset". In a like manner, the proportioning motors 12 designated "No. 1 border" or "No. 2 border" may be adjusted by manipulation of the rehearsal potentiometer 208 associated therewith to arrive at the correct and desired lighting effects.

It is therefore seen that in this modification I have not only provided a plurality of control potentiometers arranged in presets for operating proportioning motors along with means for proportionately dimming or brightening the lights controlled by the proportioning motors, but I have also provided a means whereby the lighting effects controlled by the proportioning motors 12 may be tested and tried for obtaining a desired lighting comparison without disturbing any preset in existence.

Referring now to Figure 7, I have shown a means for remotely controlling a color wheel associated with a spotlight whereby the color of the light projected by the spotlight may be remotely controlled. The spotlights are shown diagrammatically at 230 and are designated "No. 1 spotlight", "No. 2 spotlight", and "No. 3 spotlight". Each spotlight is provided with a color wheel 231 which is positioned by a shaft 25 operated by a proportioning motor 12. For purposes of illustration it is assumed that the color wheel has amber, red, white, blue and green color lenses. The proportioning motor 12 is in all respects similar to that shown in Figure 1 and each proportioning motor is controlled by control potentiometers generally designated at 13. Two or more control potentiometers 13 may be provided for each proportioning motor 12 and these control potentiometers 13 are grouped and designated as "No. 1 preset" and "No. 2 preset" respectively. The control potentiometers 13 of each preset are designated "No. 1 spotlight", "No. 2 spotlight", and "No. 3 spotlight", to correspond with the designations of the proportioning motors 12. The control potentiometers 13 of this modification are slightly different than those of Figure 1, in that the slider does not contact the potentiometer coil but engages taps on the potentiometer coil, five such taps being shown. Therefore, the proportioning motor 12 will assume five positions corresponding to the five positions of the control potentiometer 13.

The control potentiometers 13 of each preset are placed in control of the proportioning motors 12 by means of a preset switch generally designated at 233, and which may comprise a manual operator 234 for operating switches 235, 236, 237 and 238, the arrangement being such that when the manual operator 234 is moved to the left the switches are closed and when it is moved to the right the switches are open.

Power is supplied to the connections A and B of the proportioning motors 12 from the line wires 15 and 16 leading from some source of power, not shown. Power is supplied to the control system through a step-down transformer 80 having a primary 81 connected across the line wires 15 and 16, and a secondary 82. The secondary 82 is in turn connected to a lock switch 85 and when the lock switch 85 is closed power is supplied to busses 240 and 241. Bus 240 is connected to the whites of the proportioning motors 12 and to the whites of the control potentiometers 13. Bus 241 is connected to the blues of the proportioning motors 12 and to the switches 238 of the preset switches 233. The switches 238 of the preset switches 233 are in turn connected to the blues of the control potentiometer 13. The red of the proportioning motor 12 designated "No. 1 spotlight" is connected to the switch 237, which in turn is connected to the red of the control potentiometer 13 designated "No. 1 spotlight". In a like manner, the reds of the proportioning motors 12 designated "No. 2 spotlight" and "No. 3 spotlight" are connected respectively to the switches 236 and 235, which in turn are connected respectively to the reds of the control potentiometers 13 designated "No. 2 spotlight" and "No. 3 spotlight". From the above wiring connections it is seen that when the preset switch 233 of any preset is closed the reds, whites and blues of the proportioning motors 12 are connected to the reds, whites and blues of the control potentiometers 13 of that preset and the whites and blues of the proportioning motors 12 and of the control potentiometers 13 are connected across the busses 240 and 241 in the manner illustrated in Figure 1. Therefore, the proportioning motors are caused to assume positions corresponding to the adjustments of the control potentiometers 13 of the preset in control. The taps of the control potentiometers 13 are designated "amber", "red", "white", "blue" and "green." It is seen that the sliders of the control potentiometers 13 of "No. 1 preset" are engaging the taps designated "red" whereby the proportioning motors 12 are in such positions as to place the red color lenses in front of the spotlights 230. In preset No. 2 the sliders are shown to be in engagement with the tap designated "blue" and when that preset is placed in control of the proportioning motors 12, the blue lenses of the color wheels 231 are placed in front of the spotlights 230. If desired one of the color lenses of the color wheel may be replaced by an opaque disc and when the color wheel is moved to this position projection of light by the spotlight is stopped. The control potentiometers 13 may be preset upon opening of the preset switch 233 in the manner pointed out in connection with Figure 1, and the control of the proportioning motors 12 may be taken from the control potentiometers 13 of one preset and placed under the control of the control potentiometers 13 of another preset by opening the preset switch 233 of the first preset and closing the preset switch 233 of the second preset, all in the manner pointed out above.

Although I have shown only three proportioning motors 12 for controlling three color wheels 231 under the control of three potentiometers in one preset, and have also shown for purposes of illustration only two presets, it is within the contemplation of this invention to increase the number of proportioning motors and control potentiometers as desired, and also to increase the number of presets as desired.

From the above it is seen that in the modification shown by Figure 7 I have disclosed a remote control system whereby the colors of lights may be changed and controlled to get any desired color combination.

Each figure of the drawing discloses a unitary and self contained lighting control system embodying certain novel features. The various features shown in certain of the figures may equally as well be applied to the structures shown in other of the figures. In fact all of the various features may be combined into one complete lighting control system if desired. Specifically, the plurality of interlocked control panels, the plurality of interlocked presets and the various indicating means shown in Figures 2 and 3 may be equally as well applied to the structures of Figures 4 to 7. Likewise, the color switches, the stage main switch, the black-out switch and the general grouping of the control devices and motors of Figure 4 could be utilized in Figures 2, 3, 5, 6 and 7. Similarly, the master controllers, the stage master controller and the distant controller of Figure 5 could be equally as well applied to Figures 2, 3, 4, 6 and 7. Also, the rehearsal controllers, the preset release switches and the fader controllers of Figure 6 could be readily applied to the remaining figures. The color wheel control illustrated in Figure 7 may be advantageously applied to the lighting control systems of Figures 2 to 6. The combination of the various features of this invention into any type of lighting control system is within the contemplation of this invention.

Although I have shown and described, for purposes of illustration, the various controllers 13, 14, 195, 196, 197, 198 and 208 to be variable resistances of the potentiometer type, they may equally as well be any type of impedance and the use of such controllers is also within the contemplation of this invention.

This invention is not to be limited to the specific structure and embodiments set forth for purposes of illustration, but is to be limited only by the scope of the appended claims and prior art since various modifications thereof still encompassed within the scope of this invention may become obvious to those skilled in the art.

I claim as my invention:

1. In a lighting control system, the combination of a plurality of lighting means for giving a desired lighting effect, a plurality of regulating devices for regulating the light intensities of the lighting means, an adjustable control device associated with each regulating device to position the regulating devices in accordance with the adjustments of their associated control devices whereby the light intensities are selectively adjusted to desired values, and adjustable fader control means for controlling all of said regulating devices and operable to increase or decrease the light intensities of the lighting means at a rate dependent upon the relative intensities of the lighting means.

2. In a lighting control system, the combination of a plurality of lighting means for giving a desired lighting effect, a plurality of regulating devices for regulating the light intensities of the lighting means, an adjustable control device associated with each regulating device to position the regulating devices in accordance with the adjustments of their associated control devices whereby the light intensities are selectively adjusted to desired values, and adjustable fader control means for controlling said regulating devices to increase or decrease the light intensities of the lighting means to desired values, the arrangement being such that as the light intensities are increased or decreased by the fader control means to the desired values the ratio of the differences between the light intensities of the lighting means remains substantially constant.

3. In a lighting control system, the combination of a plurality of lighting means for giving a desired lighting effect, a plurality of regulating devices for regulating the light intensities of the lighting means, a motor for each regulating device for positioning the same, a remotely located adjustable control device for each motor to position the motors in accordance with the adjustments of their respective control devices, an adjustable fader control device for each motor adapted to operate the motor from its adjusted position to either extreme position and vice versa, and means for simultaneously and similarly adjusting the fader control devices to cause the ratio of the differences between the light intensities of the lighting means to remain substantially constant as the adjustable fader control devices operate the motors between their adjusted positions and their extreme positions.

4. In a lighting control system, the combination of a plurality of lighting means for giving a desired lighting effect, a plurality of regulating devices for regulating the light intensities of the lighting means, a motor for each regulating device for positioning the same, a balanced relay for each motor for controlling the operation thereof, an adjustable impedance connected to each relay for unbalancing the same to cause operation of the motor, a balancing impedance for each relay operated by the associated motor for rebalancing the relay to stop operation of the motor whereby the motors are positioned and consequently the light intensities regulated in accordance with the adjustment of the control impedances, an adjustable fader impedance connected to each relay for unbalancing the relay to cause operation of each motor to an extreme position, and means for simultaneously adjusting all of the fader impedances to cause the ratio of the differences between the light intensities of the lighting means to remain substantially constant as the adjustable fader impedances operate the motors between their adjusted positions and their extreme positions.

5. In a lighting control system, the combination of lighting means for giving a desired lighting effect, regulating means in control of said lighting means, a plurality of control means arranged in presets for controlling said regulating means, electrically operated means for placing the regulating means under the control of the control means for one preset, electrically operated means for placing the regulating means under the control of the control means for another preset, and switching means associated with each preset for automatically rendering the control means of the remaining presets inoperative to control said regulating means when the control means of any preset are placed in control of the regulating means.

6. In a lighting control system, the combination of lighting means for giving a desired lighting effect, electrically operated regulating means in control of said lighting means, a plurality of electric control means arranged in presets, connections between said electric control means and said regulating means whereby the lighting effect is controlled by said control means, electrically operated switching means for each preset adapted to be closed for placing the control means of that preset in control of the regulating means, a switch mechanism associated with each preset for operating the electrically operated switching means of that preset, and electrical interlocking connections between the electrically operated switching means of each preset to automatically open the electrically operated switching means of the remaining presets when the electrically operated switching means of one preset is closed.

7. In a lighting control system, the combination of lighting means for giving a desired lighting effect, regulating means in control of said lighting means, a plurality of control means arranged in a plurality of presets which way be more than three presets for controlling said regulating means, means for placing directly the control means of any preset in control of the regulating means regardless of which preset of control means was in control of the regulating means and regardless of the number of presets of control means, and means for automatically rendering the control means of the remaining presets inoperative to control said regulating when the control means of any preset are placed in control of the regulating means.

8. In a lighting control system, the combination of lighting means for giving a desired lighting effect, regulating means in control of said lighting means, adjustable control means for controlling said regulating means in accordance with the adjustment of said control means, electrically operated means for rendering operative and inoperative the control of said regulating means by said control means including an operating coil and a maintaining switch operated thereby, means including a normally open switch for energizing said operating coil to place the control means in control of said regulating means and to close said maintaining switch, and means including a normally closed switch and the maintaining switch for maintaining the operating coil energized independently of the normally open switch until the normally closed switch is opened to deenergize the operating coil to render inoperative the control of said regulating means by said control means.

9. In a lighting control system, the combination lighting means for giving a desired lighting effect, regulating means in control of said lighting means, a plurality of control means arranged in a plurality of presets for controlling said regulating means, electrically operated means associated with each preset for rendering operative and inoperative the control of the regulating means by the control means of that preset, each electrically operated means including an operating coil, a maintaining switch closed when the operating coil is energized and auxiliary switch means opened when the operating coil is deenergized, means associated with each preset including a normally open switch for energizing the operating coil of that preset to render the control of the regulating means by the control means of that preset operative, to close said maintaining switch and open said auxiliary switch means, and means associated with each preset including a normally closed switch, the maintaining switch of that preset and the auxiliary switch means of the remaining presets for maintaining the operating coil energized independently of the normally open switch, the arrangement being such that when the normally closed switch of the operative preset is opened or the energizing coil of any other preset is energized the operative preset is rendered inoperative.

10. In a lighting control system, the combination of lighting means for giving a desired lighting effect, regulating means in control of said lighting means, a plurality of control devices arranged in presets and each preset having a plurality of control devices, electrically operated means associated with each preset for placing the regulating means under the control of the control devices of any preset, means controlled by the electrically operated means for indicating which preset is in control of the regulating means, means controlled by the electrically operated means for indicating which control devices of the operated preset are positioned to control the regulating means to give a lighting effect, and switching means associated with each preset for automatically taking the control of the regulating means away from the control devices of any other preset when the control devices of any one preset are placed in control of the regulating means.

11. In a lighting control system, the combination of lighting means for giving a desired lighting effect, regulating means in control of said lighting means, widely spaced and remotely located control stations having control devices for controlling said regulating means from remote points, means for placing any of the control stations in control of said regulating means, and means for preventing more than one control station from being in control of said regulating means at any given time.

12. In a lighting control system, the combination of lighting means for giving a desired lighting effect, regulating means in control of said lighting means, widely spaced and remotely located control stations having control devices for controlling said regulating means from remote points, means for placing any of the control stations in control of said regulating means, and means at each control station for indicating whether another control station is in control of said regulating means.

13. In a lighting control system, the combination of lighting means for giving a desired lighting effect, regulating means in control of said lighting means, widely spaced and remotely located control stations having control devices for controlling said regulating means from remote points, means for placing any of the control stations in control of said regulating means, means for preventing more than one control station from being in control of said regulating means at any given time, and means at each control station for indicating whether another control station is in control of said regulating means.

14. In a lighting control system, the combination of lighting means for giving a desired lighting effect, regulating means in control of said lighting means, a plurality of control stations each having a plurality of control devices arranged in presets for controlling said regulating means, means for placing any of the control stations in control of the regulating means, means for preventing more than one control station from being in control of said regulating means at any one time, and means for placing the control devices of any preset of the operative control station in control of the regulating means.

15. In a lighting control system, the combination of lighting means for giving a desired lighting effect, regulating means in control of said lighting means, a plurality of control stations each having a plurality of control devices arranged in presets for controlling said regulating means, means for placing any of the control stations in control of the regulating means, means for preventing more than one control station from being in control of said regulating means at any one time, means for placing the control devices of any preset of the operative control station in control of the regulating means, and means for automatically taking the control of the regulating means away from the control devices of any other presets when the control devices of any one preset are placed in control of the regulating means.

16. In a lighting control system, the combination of lighting means for giving a desired lighting effect, regulating means in control of said lighting means, a plurality of control stations each having a plurality of control devices arranged in presets for controlling said regulating means, means for placing any of the control stations in control of the regulating means, means for preventing more than one control station from being in control of said regulating means at any one time, means for placing the control devices of any preset of the operative control station in control of the regulating means, means for automatically taking the control of the regulating means away from the control devices of any other presets when the control devices of any one preset are placed in control of the regulating means, and means for indicating which control station is operative and which preset is in control of the regulating means.

17. In a lighting control system, the combination of lighting means for giving a desired lighting effect, regulating means in control of said lighting means, a plurality of motor means for positioning said regulating means, a plurality of adjustable control devices adapted to be electrically connected to each of said motor means, said control devices being arranged in presets on a plurality of remotely located control stations and each preset including an adjustable control device for each motor means, means for placing the control devices of any control station in condition to control the motor means, means for preventing the control devices of more than one control station from controlling the motor means at any one time, means for electrically connecting the control devices of one preset to the motor means to cause the motor means to assume positions corresponding to the adjustments of their respective control devices, means for breaking this connection whereby the motor means remain in their adjusted positions while the control devices are adjusted to new positions and for reestablishing the connection whereby the motor means are positioned in accordance with the new adjustments of the control devices of that preset, means for electrically connecting the control devices of the other presets to the motors whereby the motors are positioned in accordance with the adjustments of the control devices of these presets, and means for automatically breaking the connections between the motor means and the control devices of the other presets when the control devices of one of the presets are connected to the motor means.

18. In a lighting control system, the combination of lighting means for giving a desired lighting effect, a plurality of regulating means for said lighting means, an adjustable control device for positioning each regulating means, said control devices and regulating means being arranged in groups, a group adjustable control device for each group, and means for transferring the control of the regulating means of each group from their associated control devices to the group control device for that group whereby the regulating devices of a group are positioned by the group control device of that group, a master adjustable control device for all of the regulating means, and means for transferring the control of all of the regulating means to the master control device whereby all of the regulating means are positioned by the master control device, a distant adjustable control device for all of the regulating means, and means for transferring the control of all of the regulating means to the distant control device whereby all of the regulating means are positioned by the distant control device.

19. In a lighting control system, the combination of lighting means for giving a desired lighting effect, regulating means in control of said lighting means, a plurality of control means arranged in presets for controlling said regulating means, electrically operated means for placing the regulating means under the control of the control means for one preset, electrically operated means for placing the regulating means under the control of the control means for another preset, switching means associated with each preset for automatically rendering the control means of the remaining presets inoperative to control said regulating means when the control means of any preset are placed in control of the regulating means, and means controlled by the electrically operated means for visually indicating which preset of controls is in control of the regulating means.

20. In a lighting control system, the combination of lighting means for giving a desired lighting effect, regulating means in control of said lighting means, a plurality of control means arranged in a plurality of pre-sets for controlling said regulating means, electrically operated means associated with each preset for rendering operative and inoperative the control of the regulating means by the control means of that preset, each electrically operated means including an operating coil, a maintaining switch closed when the operating coil is energized and auxiliary switch means opened when the operating coil is deenergized, means associated with each preset including a normally open switch for energizing the operating coil of that preset to render the control of the regulating means by the control means of that preset operative, to close said maintaining switch and open said auxiliary switch means, means associated with each preset including a normally closed switch, the maintaining switch of that preset and the auxiliary switch means of the remaining presets for maintaining the operating coil energized independently of the normally open switch, the arrangement being such that when the normally closed switch of the operative preset is opened or the energizing coil of any other preset is energized the operative preset is rendered inoperative, visual indicating means associated with each preset, and means controlled by the electrically operated means for controlling the visual indicating means to indicate which preset of controls is in control of the regulating means.

21. In a lighting control system, the combination of a plurality of lighting means for giving a desired lighting effect, a plurality of regulating means for regulating the lighting effect of said lighting means, a plurality of control means arranged in a plurality of presets for controlling said regulating means, electrically operated means associated with each preset for rendering operative and inoperative the control of the regulating means by the control means of that preset, switch means associated with each preset for controlling its associated electrically operated means, and means controlled by the electrically operated means for visually indicating which control devices of the operative preset are positioned to control the regulating means to give a lighting effect.

22. In a lighting control system, the combination of a plurality of lighting means for giving a desired lighting effect, a plurality of regulating means for regulating the lighting effect of said lighting means, a plurality of control means arranged in a plurality of presets for controlling said regulating means, electrically operated means associated with each preset for rendering operative and inoperative the control of the regulating means by the control means of that preset, switch means associated with each preset for controlling its associated electrically operated means, means controlled by the electrically operated means for visually indicating which control devices of the operative preset are positioned to control the regulating means to give a lighting effect, and means controlled by the electrically operated means for indicating which preset is in control of the regulating means.

23. In a lighting control system, the combination of lighting means for giving a desired lighting effect, a plurality of regulating means for said lighting means, an adjustable control means for positioning each regulating means, said control means and regulating means being arranged in color groups, a color preset control device associated with each color group only for rendering the control means of that color group inoperative to control their associated regulating means whereby the control means of that color group may be adjusted without affecting the positions of the regulating means until the control means of that color group are again rendered operative to control the regulating means whereupon the regulating means are moved to new positions corresponding to the new adjustments of the control means of that color group, the arrangement being such that the color preset control device of one color group has no influence over the control means of any other color group.

24. In a lighting control system, the combination of lighting means for giving a desired lighting effect, a plurality of regulating means for said lighting means, an adjustable control means for positioning each regulating means, said control means and regulating means being arranged in color groups, a color preset control device associated with each color group only for rendering the control means of that color group inoperative to control their associated regulating means whereby the control means of that color group may be adjusted without affecting the positions of the regulating means until the control means of that color group are again rendered operative to control the regulating means whereupon the regulating means are moved to new positions corresponding to the new adjustments of the control means of that color group, the arrangement being such that the color preset control device of one color group has no influence over the control means of any other color group, and a stage preset control device associated with all of the color groups for rendering all of the control means inoperative to control their associated regulating means whereby all of the control means may be adjusted without affecting the positions of the regulating means until the control means are again rendered operative to control the regulating means whereupon the regulating means are moved to new positions corresponding to the new adjustments of the control devices.

25. In a lighting control system, the combination of lighting means for giving a desired lighting effect, regulating means for regulating the light intensities of said lighting means, motor means for positioning said regulating means, means including a relay for controlling said motor means, an adjustable control device, connections between the adjustable control device and the relay for positioning the motor means in accordance with the adjustment of said control device whereby the light intensities of the lighting means are regulated, and means included in said connections for interrupting the control of the motor means by said control device and operable to move said motor means to an extreme position to extinguish the lighting means.

26. In a lighting control system, the combination of lighting means for giving a desired lighting effect, a plurality of regulating means for said lighting means to regulate the light intensities thereof, motor means for positioning each of said regulating means, means including a relay for controlling each motor means, a plurality of adjustable control devices, one for each relay, connections between the adjustable control devices and their respective relays for positioning their respective motor means in accordance with the adjustments of the control devices whereby the light intensities of the lighting means are regulated, and means included in said connections for interrupting the control of the motor means by said control devices and operable to move the motor means to extreme positions to extinguish the lighting means, and for returning the control of said motor means to said control devices whereby the motor means are again positioned in accordance with the adjustments of the control devices.

27. In a lighting control system, the combination of lighting means for giving a desired lighting effect, a plurality of regulating means for said lighting means to regulate the light intensities thereof, motor means for positioning each regulating means, means including a relay for controlling each motor means, a plurality of adjustable control devices, one for each relay, said adjustable control devices and motor means being arranged in groups, connections between the control devices and their respective relays for positioning their respective motor means in accordance with the adjustments of the control devices whereby the light intensities of the lighting means are independently regulated, a group preset control means associated with each group only and controlling only the connections of that group for rendering the control devices of that group inoperative to control their associated motor means whereby the control devices of that group may be adjusted without affecting the positions of the regulating means until the control devices of that group are again rendered operative to control the motor means whereupon the regulating means are moved to new positions corresponding to the new adjustments of the control devices of that group, and blackout means included in all of said connections for interrupting the control of all of said motor means by said control devices and operable to move the motor means to extreme positions to extinguish the lighting means.

28. In a lighting control system, the combination of lighting means for giving a desired lighting effect, a plurality of regulating means for said lighting means to regulate the light intensities thereof, motor means for positioning each regulating means, means including a relay for controlling each motor means, a plurality of adjustable control devices, one for each relay, said adjustable control devices and motor means being arranged in groups, connections between the control devices and their respective relays for positioning their respective motor means in accordance with the adjustments of the control devices whereby the light intensities of the lighting means are independently regulated, a group preset control means associated with each group only and controlling only the connections of that group for rendering the control devices of that group inoperative to control their associated motor means whereby the control devices of that group may be adjusted without affecting the positions of the regulating means until the control devices of that group are again rendered operative to control the motor means whereupon the regulating means are moved to new positions corresponding to the new adjustments of the control devices of that group, a stage preset control means associated with all of the groups and controlling the connections of all of the groups for rendering all of the control devices inoperative to control their associated motor means whereby the control devices may be adjusted without affecting the positions of the regulating means until the control devices are again rendered operative to control the motor means whereupon the regulating means are moved to new positions corresponding to the new adjustments of the control devices, and blackout means included in all of said connections for interrupting the control of all of said motor means by said control devices and operable to move the motor means to extreme positions to extinguish the lighting means.

29. In a lighting control system, the combination of lighting means for giving a desired lighting effect, a plurality of regulating means for said lighting means, an adjustable control means for positioning each regulating means, said control means and regulating means being arranged in color groups, a color master control means associated with each color group only, and means for transferring the control of the regulating means of any color group from their respective control means to their associated color master control means whereby the regulating means of a color group may be positioned by the color master control means of that group, the arrangement being such that the color master control means of any color group has no influence over the control of the regulating means of any other color group.

30. In a lighting control system, the combination of lighting means for giving a desired lighting effect, a plurality of regulating means for said lighting means, an adjustable control means for positioning each regulating means, said control means and regulating means being arranged in color groups, a color master control means associated with each color group only, means for transferring the control of the regulating means of any color group from their respective control means to their associated color master control means whereby the regulating means of a color group may be positioned by the color master control means of that group, the arrangement being such that the color master control means of any color group has no influence over the control of the regulating means of any other color group, a stage master control means, and means for transferring the control of the regulating means from their respective control means to the stage master control means whereby the regulating means may be positioned by the stage master control means.

31. In a lighting control system, the combination of lighting means for giving a desired lighting effect, a plurality of regulating means for said lighting means, an adjustable control means for positioning each regulating means, said control means and regulating means being arranged in color groups, a color master control means associated with each color group only, means for transferring the control of the regulating means of any color group from their respective control means to their associated color master control means whereby the regulating means of a color group may be positioned by the color master control means of that group, the arrangement being such that the color master control means of any color group has no influence over the control of the regulating means of any other color group, and a color preset control device associated with each color group only for rendering the control means and the color master control means of that color group inoperative to control their associated regulating means whereby the control means and the color master control means of that color group may be adjusted without affecting the positions of the regulating means until the control means and the color master control means of that color group are again rendered operative to control the regulating means whereupon the regulating means may be moved to new positions corresponding to the new adjustments of the control means and the color master control means of that color group.

32. In a lighting control system, the combination of lighting means for giving a desired lighting effect, a plurality of regulating means for said lighting means, an adjustable control means for positioning each regulating means, said control means and regulating means being arranged in color groups, a color master control means associated with each color group only, means for transferring the control of the regulating means of any color group from their respective control means to their associated color master control means whereby the regulating means of a color group may be positioned by the color master control means of that group, the arrangement being such that the color master control means of any color group has no influence over the control of the regulating means of any other color group, a color preset control device associated with each color group only for rendering the control means and the color master control means of that color group inoperative to control their associated regulating means whereby the control means and the color master control means of that color group may be adjusted without affecting the positions of the regulating means until the control means and the color master control means of that color group are again rendered operative to control the regulating means whereupon the regulating means may be moved to new positions corresponding to the new adjustments of the control means and the color master control means of that color group, a stage master control means, means for transferring the control of the regulating means from their respective control means to the stage master control means whereby the regulating means may be positioned by the stage master control means, and a stage preset control device associated with all of the color groups for rendering all of the control means, the color master control means and the stage master control means inoperative to control their associated regulating means whereby all of the control means, the color master control means and the stage master control means without affecting the positions of the regulating means until the control means, the color master control means and the stage master control means are again rendered operative to control the regulating means whereupon the regulating means are moved to new positions to the new adjustments of the control means, the color master control means and the stage master control means.

33. In a lighting control system, the combination of a lighting means for giving a desired lighting effect, a plurality of regulating means for regulating the light intensities of the lighting means, a plurality of adjustable control means for said regulating means, said control means being arranged in presets, means for placing the control means of any preset in control of the regulating means whereby the regulating means are positioned in accordance with the adjustments of the control means of the selected preset, and fader control means associated with said regulating means operable to increase or decrease the light intensities of the lighting means at a rate dependent upon the relative intensities of the lighting means.

34. In a lighting control system, the combination of lighting means for giving a desired lighting effect, a plurality of regulating means for regulating the light intensities of the lighting means, a plurality of adjustable control means for said regulating means, said control means being arranged in presets, means for placing the control means of any preset in control of the regulating means whereby the regulating means are positioned in accordance with the adjustments of the control means of the selected preset, fader control means associated with said regulating means operable to increase or decrease the light intensities of the lighting means at a rate dependent upon the relative intensities of the lighting means, other adjustable control means associated with said regulating means, and means for taking the control of any of said regulating means away from its associated control means and placing it under the control of the other adjustable control means associated therewith whereby any regulating means may be independently positioned.

35. In a lighting control system, the combination of lighting means for giving a desired lighting effect, a plurality of regulating means for said lighting means, an adjustable control means for positioning each regulating means, said control means and regulating means being arranged in color groups, a color preset control device associated with each color group only for rendering the control means of that color group inoperative to control their associated regulating means whereby the control means of that color group may be adjusted without affecting the positions of the regulating means until the control means of that color group are again rendered operative to control the regulating means whereupon the regulating means are moved to new positions corresponding to the new adjustments of the control means of that color group, the arrangement being such that the color preset control device of one color group has no influence over the control means of any other color group, and means for interrupting control of the regulating means by the control means and operable to position the regulating means to an extreme position to extinguish the lighting means.

36. In a lighting control system, the combination of lighting means for giving a desired lighting effect, a plurality of regulating means for said lighting means, an adjustable control means for positioning each regulating means, said control means and regulating means being arranged in color groups, a color master control means associated with each color group only, means for transferring the control of the regulating means of any color group from their respective control means to their associated color master control means whereby the regulating means of a color group may be positioned by the color master control means of that group, the arrangement being such that the color master control means of any color group has no influence over the control of the regulating means of any other color group, and means for interrupting control of the regulating means by the control means and operable to position the regulating means to an extreme position to extinguish the lighting means.

37. In a lighting control system, the combination of lighting means for giving a desired lighting effect, a plurality of regulating means for said lighting means, an adjustable control means for positioning each regulating means, said control means and regulating means being arranged in color groups, a color preset control device associated with each color group only for rendering the control means of that color group inoperative to control their associated regulating means whereby the control means of that color group may be adjusted without affecting the positions of the regulating means until the control means of that color group are again rendered operative to control the regulating means whereupon the regulating means are moved to new positions corresponding to the new adjustments of the control means of that color group, the arrangement being such that the color preset control device of one color group has no influence over the control means of any other color group, and fader control means associated with said regulating means and operable to increase or decrease the light intensities of the lighting means at a rate dependent upon the relative intensities of the lighting means.

38. In a lighting control system, the combination of lighting means for giving a desired lighting effect, a plurality of regulating means for said lighting means, an adjustable control means for positioning each regulating means, said control means and regulating means being arranged in color groups, a color master control means associated with each color group only, and means for transferring the control of the regulating means of any color group from their respective control means to their associated color master control means whereby the regulating means of a color group may be positioned by the color master control means of that group, the arrangement being such that the color master control means of any color group has no influence over the control of the regulating means of any other color group, and fader control means associated with said regulating means and operable to increase or decrease the light intensities of the lighting means at a rate dependent upon the relative intensities of the lighting means.

CLARENCE W. NESSELL.